US009350416B2

(12) United States Patent
Picard

(10) Patent No.: US 9,350,416 B2
(45) Date of Patent: May 24, 2016

(54) FREQUENCY HOPPING SEQUENCE GENERATION

(71) Applicant: Itron, Inc., Liberty Lake, WA (US)

(72) Inventor: Gilles Picard, Thiais (FR)

(73) Assignee: Itron France, Issy-les-Moulinaux (FR)

( * ) Notice: Subject to any disclaimer, the term of this patent is extended or adjusted under 35 U.S.C. 154(b) by 0 days.

(21) Appl. No.: 14/558,553

(22) Filed: Dec. 2, 2014

(65) Prior Publication Data

US 2015/0326275 A1    Nov. 12, 2015

Related U.S. Application Data

(60) Provisional application No. 61/990,006, filed on May 7, 2014.

(51) Int. Cl.
*H04B 1/7143* (2011.01)
*H04B 1/7156* (2011.01)

(52) U.S. Cl.
CPC ............ *H04B 1/7143* (2013.01); *H04B 1/7156* (2013.01)

(58) Field of Classification Search
CPC ..................... H04B 1/7143; H04B 1/7156
See application file for complete search history.

(56) References Cited

U.S. PATENT DOCUMENTS

| 5,185,610 | A  | * | 2/1993 | Ward et al. ............... 342/357.24 |
| 7,035,314 | B1 |   | 4/2006 | Linsky |
| 7,520,598 | B2 | * | 4/2009 | Xu et al. ......................... 347/77 |
| 7,920,598 | B2 | * | 4/2011 | Luo .............................. 370/509 |
| 7,965,758 | B2 |   | 6/2011 | Picard |
| 2007/0071068 | A1 |   | 3/2007 | Lablans |
| 2009/0136034 | A1 | * | 5/2009 | Gaal et al. ..................... 380/268 |
| 2012/0014414 | A1 |   | 1/2012 | Jeong et al. |

FOREIGN PATENT DOCUMENTS

WO    WO2008033514    3/2008

OTHER PUBLICATIONS

The Extended European Search Report mailed Sep. 7, 2015 for European Patent Application 15150968.4, 8 pages.

* cited by examiner

*Primary Examiner* — Jean B Corrielus
(74) *Attorney, Agent, or Firm* — Lee & Hayes, PLLC

(57) ABSTRACT

Techniques for frequency-hopping sequence-generation are described herein. In one example, a sequence of pseudo random numbers may be used to generate a scrambling sequence. The scrambling sequence may be used to map an unscrambled sequence of channels into a scrambled sequence of channels. Channel-repeats may be detected in the scrambled sequence of channels and resolved. Channel whitening may be performed to reduce channel overuse resulting from the channel-repeat resolutions. The scrambled sequence of channels may be provided to a radio to enable the radio to tune to the channels indicated by the scrambled sequence of channels.

20 Claims, 16 Drawing Sheets

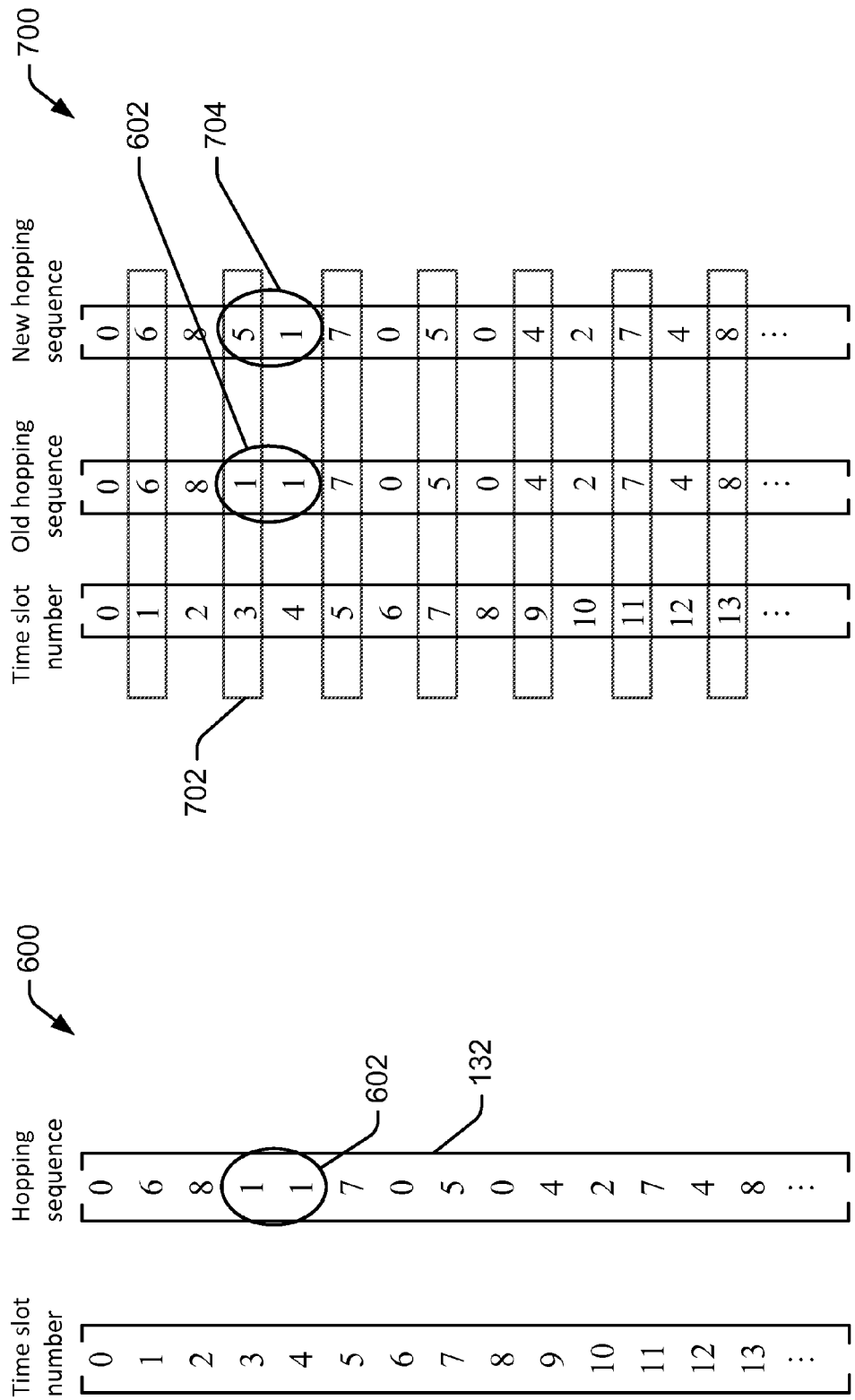

FREQUENCY HOPPING SEQUENCE GENERATION

RELATED APPLICATIONS

This patent application claims priority to U.S. provisional patent application Ser. No. 61/990,006, titled "Frequency Hopping Sequence Generation", filed on 07 May 2014, commonly assigned herewith, and hereby incorporated by reference.

BACKGROUND

Frequency hopping (channel hopping) may be used in radio frequency (RF) communications to mitigate interference and to increase reliability. Additionally, regulations may require use of such spread spectrum techniques in some conditions. Despite these advantages, differences in the spectrum and number of channels available at different locations may prevent reuse of existing designs.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 6 is a diagram showing an example of a channel-repeat in a hopping sequence of channels.

FIG. 7 is a diagram showing example replacement of a channel, thereby resolving the channel-repeat.

DETAILED DESCRIPTION

Overview

Frequency-hopping is a method of transmitting radio signals by rapidly switching a carrier signal among many frequencies or channels, thereby transmitting over a spread spectrum. In some instances, sequence of frequencies or channels may be determined in a pseudorandom manner. Generally, the sequence and timing are known to both a transmitter and a receiver to allow continued communication after frequency hops. Frequency hopping helps to reject interference(s) that may be present in an area of (radio frequency) RF spectrum, and also may be mandated by regulations to prevent continuous occupation of a particular frequency. Frequency hopping may be utilized in many different types of networks, including communication networks, control systems, advance metering (e.g., utility metering) infrastructures (AMI), and others.

In one example, a sequence of pseudo random numbers may be used to generate a scrambling sequence. The scrambling sequence may be used to map an unscrambled sequence of channels into a scrambled sequence of channels. Channel-repeats may be detected in the scrambled sequence of channels and resolved. Channel whitening may be performed to reduce channel overuse, which may result from the channel-repeat resolutions. A radio may be operated according to spread spectrum frequency hopping techniques using channels indicated by the scrambled sequence of channels.

Example System and Techniques

Figure 1:
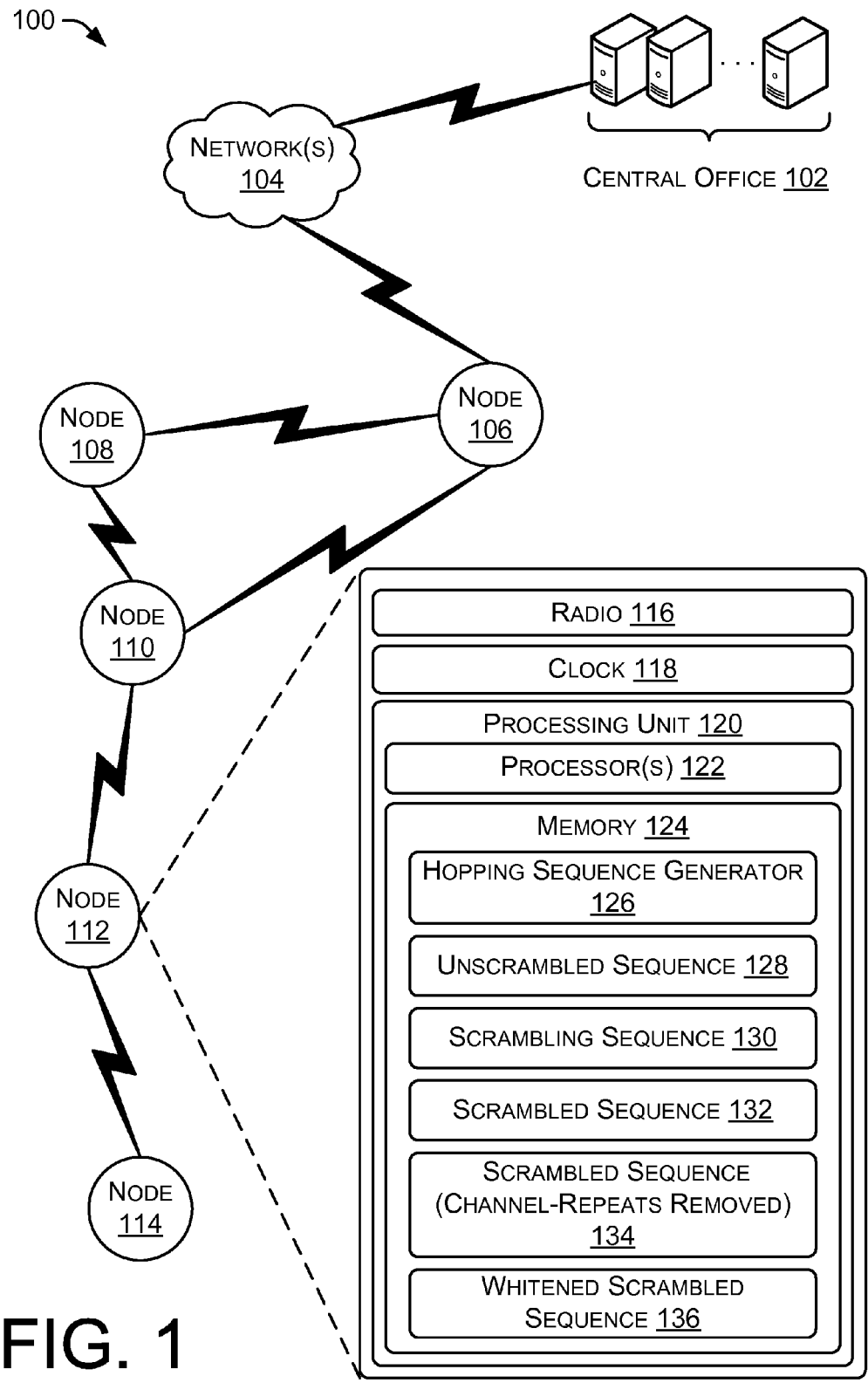
FIG. 1 is a block diagram showing an example network, and showing detail of a node configured for frequency hopping according to a hopping sequence generator utilizing techniques discussed herein.

FIG. 1 is a block diagram showing an example network 100, which may be configured as a communications network, a control system network, a smart grid or advanced metering infrastructure (AMI) of a utility network, etc. Central office(s) 102 may communicate with one or more networks 104, which may include the Internet, cellular network, etc. A plurality of nodes 106-114 may be associated with electrical meters, transformers, water meters, gas meters, or other devices on any type of network or AMI. The nodes may communicate with each other using RF communication, and may be configured as a mesh network in which messages are passed from node to node, a star network with a central hub, or a combination or hybrid network.

An example node 112 may include a radio 116, which may be configured to transmit and/or receive. In the example shown, the radio 116 is a transceiver, configured to communicate with both upstream (toward a root node or edge device) and downstream (toward a child or leaf node) nodes, including the transmission of packets to/from nodes 110 and 114. The radio 116 may be configured for frequency hopping over a spread spectrum of channels.

A clock 118 provides time-of-day and/or time-measurement to various devices on the node 112, and may provide information to the radio 116 to support channel hopping. A processing unit 120 may include one or more processors 122 and memory 124. In other examples, the processing unit 120 may be implemented as one or more other hardware circuits (e.g., an ASIC, an FPGA, etc.).

A hopping sequence generator 126 may be located in memory 124 and executed by the processing unit 120. Alternatively, the hopping sequence generator 126 may be configured as a dedicated hardware or hybrid hardware/software device. In one example, the hopping sequence generator 126 is configured to utilize an unscrambled sequence of channels 128 that are available to the network 100. The unscrambled sequence of channels 128 may be a list of channels, 0 through N−1, that are available to, and used by, nodes on the network 100. The unscrambled sequence of channels 128 may be include the channels 0 through N−1 repeated a number of times. The number of repetitions may depend at least in part on the number of channels available, a length of time each channel is used (i.e., the length of the timeslot used), and if a 24-hour supply of scrambled channels is desired. The channels 0 through N−1 may correspond to a portion of the RF spectrum that is leased or public domain, or otherwise available and used by the nodes in the network 100. The hopping sequence generator 126 may utilize a scrambling sequence 130, which may have been derived from pseudo random numbers (e.g., as provided by a Galois field). The scrambling sequence 130 may be used to map and/or scramble the unscrambled sequence of channels 128 into a scrambled sequence of channels 132. Also, the scrambling sequence 130 may include a repetition of a sequence of pseudo random elements provided by the Galois field. The number of repetitions used within each sequence 128, 130, may be selected to result in a scrambled sequence of channels for association with a number of timeslots required for a 24-hour (or other length) period.

In one example, 36 channels may be available and a Galois field may be selected to provide 240 random numbers. In this example, 20 repetitions of the 36 channels, 0 through 35, could be used to create an unscrambled sequence of channels 128 of length 720. Three repetitions of the 240 random numbers could be used to create a scrambling sequence 130 of length 720. Thus, the unscrambled sequence of channels 128 may be mapped, using the scrambling sequence 130, to create the scrambled sequence of channels 132 having 720 channels for association with 720 time slots (which may be associated with a 24-hour day).

A scrambled sequence of channels (having channel-repeats removed) 134 may be created. The scrambling process may introduce channel-repeats (e.g., two adjacent timeslots having the same channel), into the scrambled sequence of channels 132. The sequence 134 is a refinement of the scrambled sequence 132, has the channel-repeats removed, and will be discussed further, below.

Removal of channel-repeats may cause some channels to be used more than others. A whitened scrambled sequence of channels 136 improves the situation, by lessening the variance in usage of different channels. Channel whitening will be discussed further, below.

Example Hopping Sequence Generation

Figure 2:
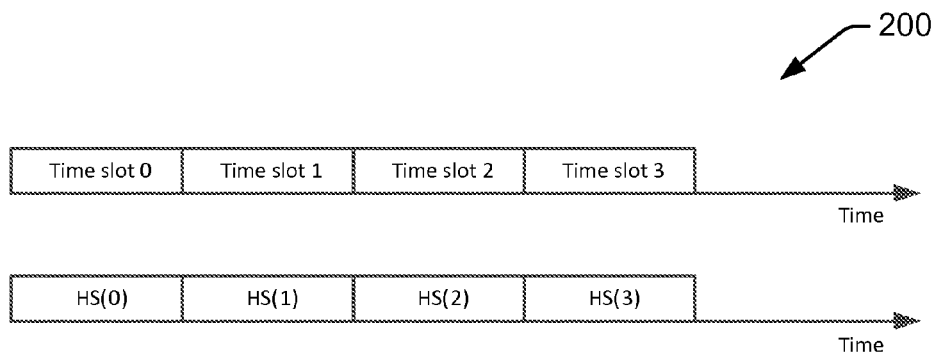
FIG. 2 is a diagram showing a relationship between timeslots and a hopping sequence.

FIG. 2 is a diagram showing an example relationship 200 between timeslots and hopping sequences. In the example, each timeslot is associated with a hopping sequence channel. Thus, at any given time, a particular frequency is in use by a transmitter and receiver. Upon conclusion of the timeslot, the transmitter and receiver may move to a different frequency and/or channel associated with the next timeslot.

Frequency hopping is a spread spectrum technique that may be used when a band (i.e., a portion of the RF spectrum) is to be shared between several users. Frequency hopping may be used to mitigate link impairments (i.e., reception problems between network nodes) due to interference and also to minimize interference caused by the network nodes to other users of the band. The network (e.g., network 100 of FIG. 1) may be allowed to use a frequency band of finite extent (e.g., the 902 MHz-928 MHz ISM band). The band utilized by the network may be subdivided into channels (e.g., 64 channels (IEEE 802.15.4g OFDM Option 3)). In one example, the network utilizes frequency hopping by using available channels (or a significant subset of them) in a sequence, called the hopping sequence. By frequency hopping, the RF traffic is spread over the band.

The frequency hopping sequence may have certain characteristics, or may be configured to conform to certain requirements. The hopping sequence describes a sequence by which the channels in a channel plan may be utilized. The channel plan may include the center frequencies and occupied bandwidths of a plurality of channels that are available for use. The channel plan and hopping sequence may be associated with a modulation scheme. In one example, the hopping sequence may be configured to use all channels equally (or nearly equally). Also, so that communication is successful and synchronized, both the transmitter and the receiver should know the hopping sequence and the modulation scheme. The hopping sequence may be described by notation (e.g., HS(k), wherein HS is a particular hopping sequence, k is a particular timeslot, and HS(k) is a particular channel at the particular timeslot). Interference is mitigated if the sequence is random, pseudo random, or nearly so. For example, hopping only between adjacent channels may not be effective to avoid interference from wide-band interferers.

In the example of FIG. 2, a time period (e.g., 24 hours) may be divided into periods called "timeslots" or "time slots" which may be of equal length. Timeslots zero through three are shown in FIG. 2. A hopping sequence may be associated with the timeslots. The hopping sequence associates a channel or RF frequency with each timeslot. In the example of FIG. 2, the sequence (HS(0), HS(1), HS(2), ...), where HS(k) represents a channel number or frequency, is the hopping sequence. Accordingly, each timeslot is mapped to an element of the hopping sequence. During timeslot number k, the receiver is listening on channel number HS(k). If the transmitter wants to send a packet during timeslot number k, it will send it on channel number HS(k), and a receiver will receive it on that channel.

Thus, FIG. 2 shows an example by which a single hopping sequence may be associated with a given set of channels. However, the techniques disclosed herein perform additional functionality. In one example, different networks may be associated with different radio bands (i.e., RF spectrum of different widths and frequencies). Techniques described herein adapt the hopping sequence to any number of channels. Accordingly, the hopping sequence generator 126 of FIG. 1 is adapted to differing availability of RF spectrum, different channel locations, and/or different numbers and lengths of timeslots. Accordingly, the hopping sequence generator 126 may configure a node for use in a system or network having different available spectrum and design requirements.

Because several networks (or sub-networks) might share a same (or nearby) geographic area, an issue of radio interference may exist. To lessen such interference, the hopping sequence generator 126 may be configured to provide a hopping sequence for a network that is quasi-orthogonal to sequences used by other networks. Accordingly, the hopping sequence generator 126 may provide hopping sequences that minimize interference between networks.

A particular channel in a hopping sequence (e.g., channel HS(k)) may be calculated to allow a transmitter or receiver to tune that channel directly, without storage of entire hopping sequences in memory. Accordingly, radio and/or transceiver 116 can compute on-the-fly the next channel to be used and doesn't need to store entire sequences in memory. Thus, a formula and a real-time clock may be used to determine a current timeslot and an associated hopping sequence channel.

Another feature of the sequence HS(k) of FIG. 2 is that it may be configured to repeat itself after one full day. In this way the hopping sequence can be easily synchronized with a system, network or other real-time clock.

Figure 3:
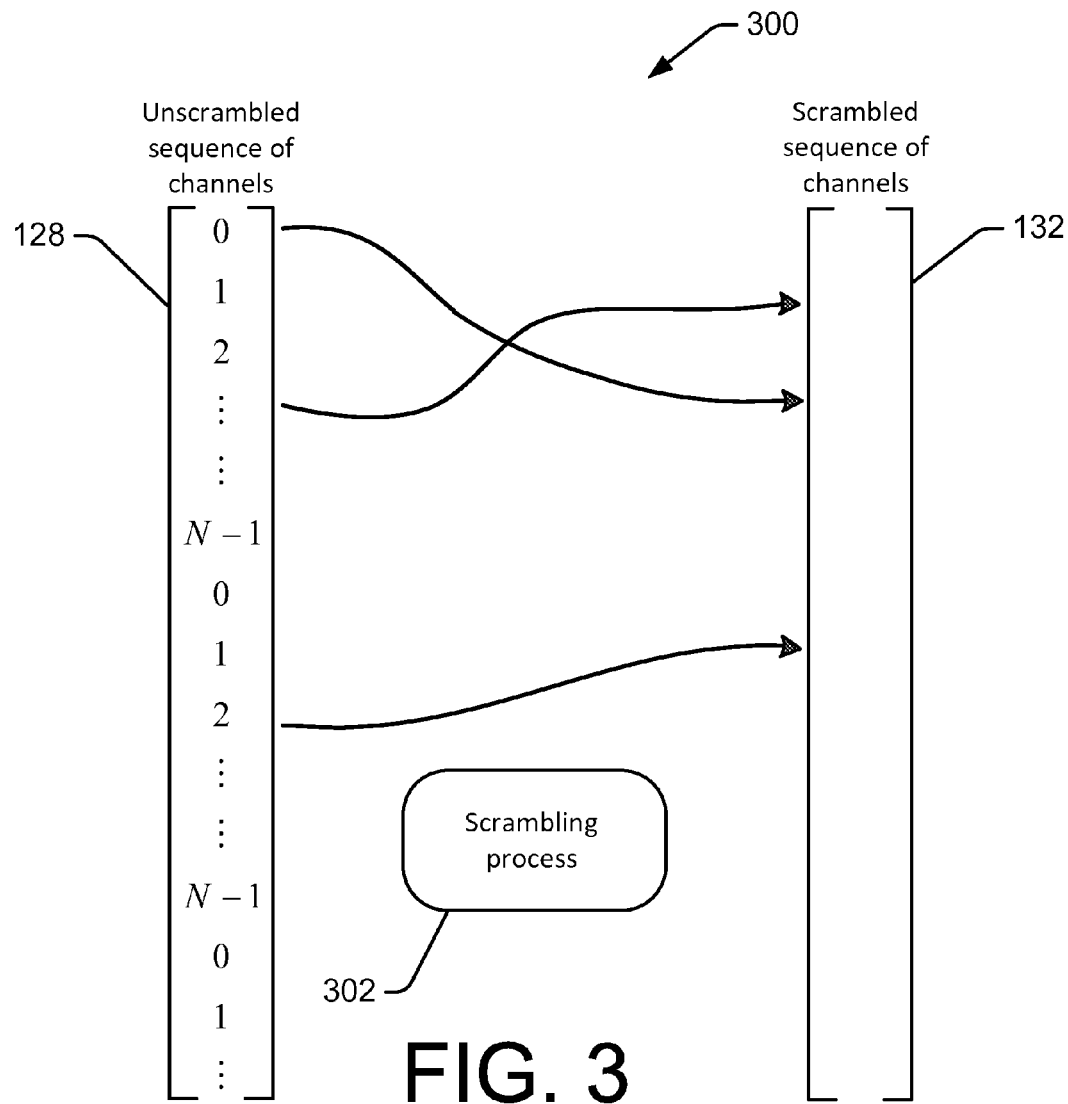
FIG. 3 is a diagram showing an example scrambling process, by which available channels are scrambled for use in a hopping sequence.

FIG. 3 is a diagram showing a first example of hopping sequence generation 300, by which an unscrambled sequence of channels 128 is scrambled to create the scrambled sequence of channels 132. In this first example 300 of hopping sequence generation, a channel number may appear twice in a row in the scrambled sequence 132 (this is referred to as a channel-repeat). This repetition may be undesirable in some circumstances. Other hopping sequence generation techniques, described herein, may be used to avoid channel-repeats.

The scrambled sequence of channels 132, created by the hopping sequence generation 300 techniques, may be used as a channel hopping sequence within a network. The hopping sequence generation may utilize a scrambling process 302 to reorganize a natural order of channels (e.g., channel 0, channel 1, channel 2, . . . ) in a pseudo-random way. In one example, the scrambling process 302 may utilize a scrambling sequence (e.g., scrambling sequence 130 of FIG. 1). To continue the example, the scrambling sequence may be generated by a Galois field, such as GF(241). The scrambled sequence of channels 132 may be used as a hopping sequence of channels associated with timeslots. In operation, radios in nodes in the network tune to a particular channel indicated by the scrambled sequence of channels 132 associated with a present timeslot, which may be based at least in part on the time of day.

Without scrambling, the nodes, system and/or a network would use N available channels starting from the first one (channel 0) in a natural increasing order. After the last channel (channel N−1) had been used this would start over with the first channel Such channel use may tend to be less effective at avoiding interference, and more prone to create interference within the network, than a scrambled sequence of channels. To avoid these problems, the scrambling process 302 assigns a new position to each channel of the unscrambled sequence 128 to create the scrambled sequence 132.

In the example shown, all channels are evenly and/or equally represented in the initial unscrambled sequence 128. Accordingly, all channels will also be evenly represented (equally used) in the scrambled sequence 132. That is, because only the positions of the channels are changed by the scrambling process 302, each channel in the scrambled sequence of channels is equally represented. However, while channels are equally utilized, channel-repeats are possible. Techniques for removing such repeats are discussed below.

Figure 4:
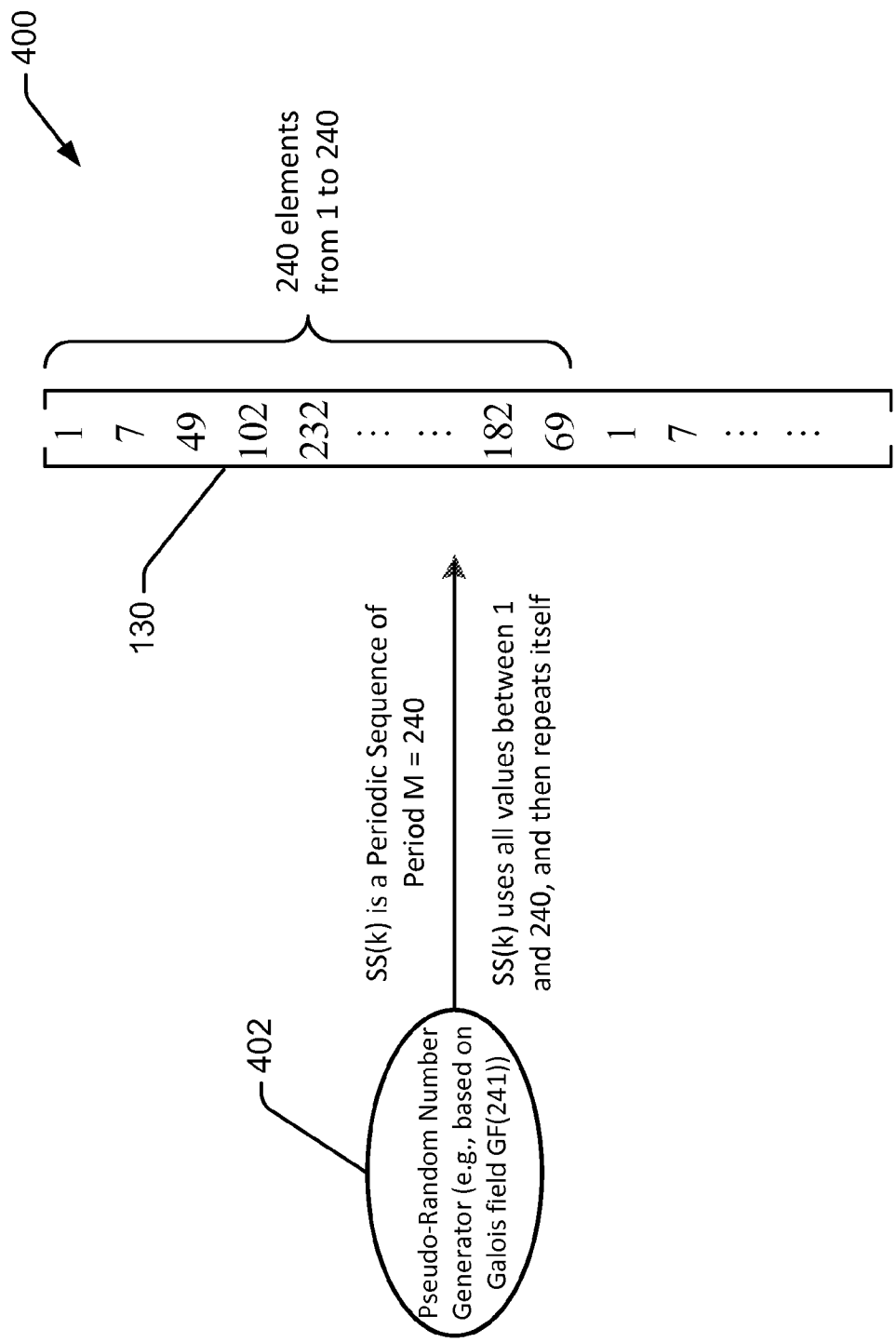
FIG. 4 is a diagram showing an example of how a Galois field may be used to create a periodic pseudo-random channel sequence.

FIG. 4 is a diagram showing techniques 400 for creation of a periodic pseudo-random sequence. Such a sequence may be used as the scrambling sequence 130 of FIG. 1. In operation, the scrambling sequence 130 may be used to scramble the unscrambled sequence of channels 128 into a scrambled sequence of channels 132.

In the example of FIG. 4, a pseudo-random number generator 402 is used to generate random numbers. In the example shown, a Galois field (e.g., GF(241)) may be used to create the scrambling sequence 130.

Figure 5:
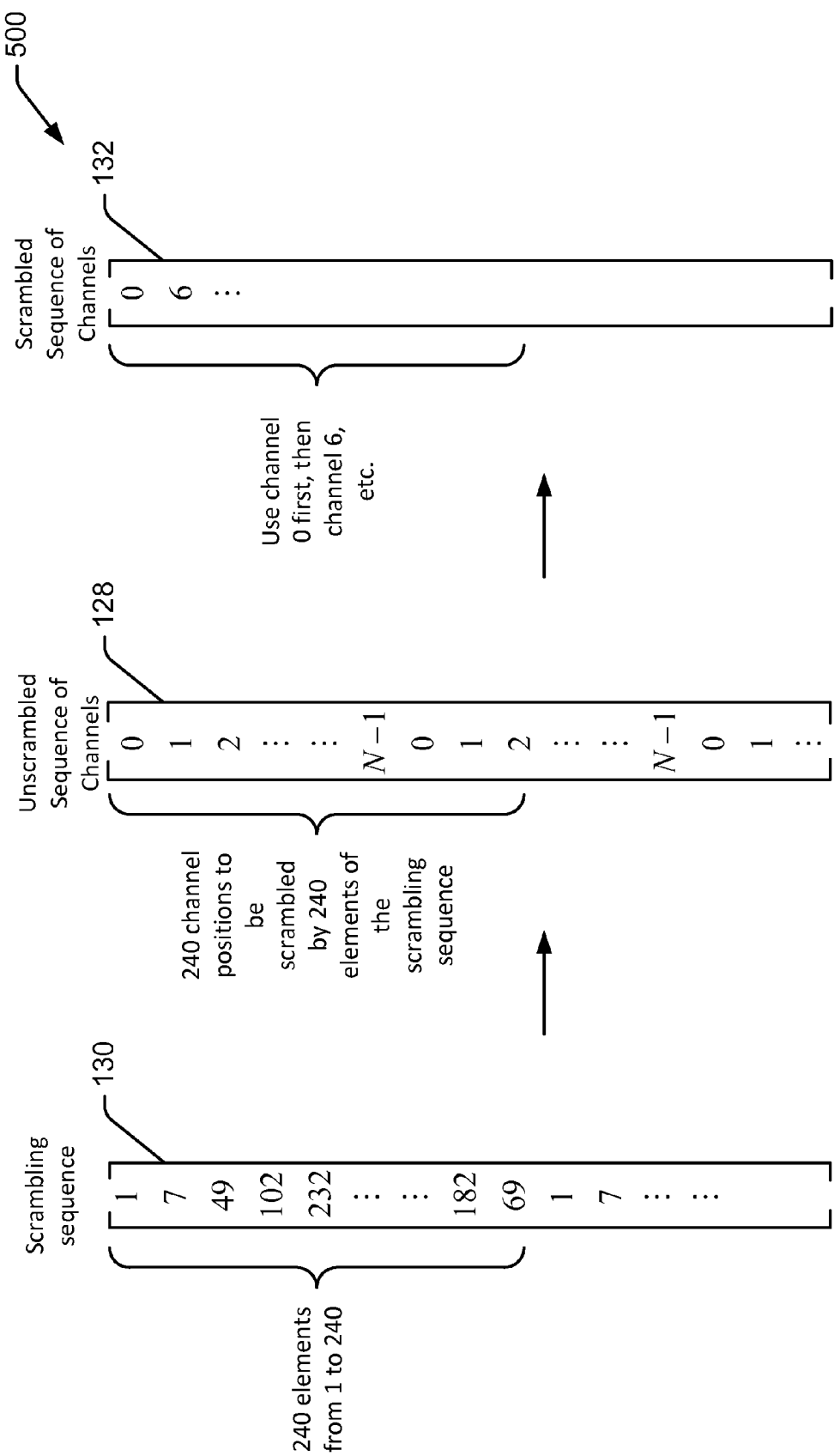
FIG. 5 is a diagram showing an example relationship between a scrambling sequence, an unscrambled sequence of channels and a scrambled sequence of channels.

FIG. 5 is a diagram showing an example relationship 500 between a scrambling sequence 130, an unscrambled sequence of channels 128 and a scrambled sequence of channels 132. In the example shown, the scrambling is performed on successive blocks of 240 elements of the unscrambled sequence of channels. The mechanism by which the unscrambled sequence of channels is scrambled is shown by the example 500. The magnitude or numerical value of each value in the scrambling sequence 130 is used to select an element in the unscrambled sequence of channels 128 for addition to the scrambled sequence of channels 132. Thus, because first value in the scrambling sequence 130 is the number 1, the first channel (channel 0) from the unscrambled sequence of channels 128 is the first channel in the scrambled sequence of channels 132. And, because the second value in the scrambling sequence 130 is the number 7, the seventh channel (channel 6) from the unscrambled sequence of channels 128 is used as the second channel in the scrambled sequence of channels 132. And further, because the third value of the scrambling sequence 130 is the number 49, and the forty-ninth value from the unscrambled sequence of channels 128 becomes the third channel in the scrambled sequence of channels 132. Accordingly, each successive 240 elements of the scrambled sequence of channels 132 are created in this manner.

Note that the number of channels may be significantly less (e.g., 36 channels) than the number of elements repeated in the scrambling sequence (e.g., 240). In this example, if two consecutive elements in the scrambling sequence differ in value by 36, this may cause the same channel to be used in the two consecutive locations of the scrambled sequence of channels 132. Such channel repetition may be considered a channel-repeat. In some instances, channel-repeats may somewhat degrade a node's ability to reject interference and may somewhat increase interference created by the node.

Example Techniques to Detect and Correct Channel-Repeat

FIG. 6 is a diagram showing an example 600 of a channel-repeat in a hopping sequence of channels 132. In the example shown, channel 1 is used twice in consecutive timeslots at location 602. As noted above, this could be the result of consecutive random numbers in the scrambling sequence differing by an amount equal to the number of channels available to the network. Thus, FIG. 6 illustrates a problem, i.e. a channel-repeat in a timeslot, which may be resolved by appropriate replacement of one of the repeating channels with a different channel. The method of channel-repeat resolution is efficient, and utilizes minimal power (thereby saving batteries, in some installations). Advantageously, resolution of the channel-repeats results in more uniform channel usage and therefore better compatibility in many installations and applications.

When the number of channels (e.g., 36 or 64 channels) is much smaller than the period of the random number sequence (e.g., 240, associated with GF(241)), the same channel may occasionally be used for two consecutive timeslots. When the number of channels is high (for instance 64) this will not be frequent and can be acceptable for many applications. For other applications or when the number of channels is low (e.g., 8 or 10 channels), the number of channel-repeats could be considered an imperfection of the hopping sequence and correction may be desirable.

FIG. 7 is a diagram showing resolution of the channel-repeat issue of FIG. 6. In particular, the channel-repeat 602 has been resolved in the old hopping sequence by replacement of the channel 1 in timeslot 3 (shown at 702) with channel 5 (shown at 704). By replacing channel 1 with channel 5 at timeslot 3, the channel-repeat is overcome. Also, because of the selection of channel 5 as the replacement channel for use in timeslot 3 of the new hopping sequence, no new channel-repeat was created. Note that selection of channel 8 in timeslot 3 would have resulted in a new channel-repeat.

In one example, changing the hopping sequence values only at odd (or even) timeslots is enough to avoid all channel-repeats and to provide channel-repeat resolution. Thus, in the example of FIG. 7, the channel used by timeslot 3 was changed. The hopping sequence at even (or odd) timeslots is never modified.

Several benefits result from this system of channel-repeat resolution. First, because only odd (or even) timeslots are changed, at least half of the hopping sequence values will be left unchanged in the new hopping sequence. Only every second timeslot needs to be checked for a channel-repeat.

Secondly, creation of a second channel-repeat is easily prevented, when correcting for an existing channel-repeat. If a channel-repeat is detected, it is important only to consider the hopping sequence value at three timeslots (the present one, the one just before and the one just after). For instance in the example shown in FIG. 7, the channel used in timeslot 3 may be changed because the same channel is used in timeslot 4. A channel different from channel 8 must be selected (because channel 8 is used in timeslot 2). A channel different from channel 1 must be selected, because channel 1 is used in timeslot 4. Accordingly, the channel used in timeslot 3 may be selected from among channels other than channel 1 (which is used in timeslot 4 and caused the channel-repeat) and channel 8 (which is used in timeslot 2). Thus, selection is made from channels other than 1 and 8. The selection may be performed in a pseudo-random way among all available channels. The scrambling sequence (e.g., scrambling sequence 130 of FIG. 1) may be used to make the selection of the replacement channel for timeslot 3. The scrambling sequence may be used because it includes pseudo-random information already available in the process and available to all nodes, including transmitters and receivers.

At any moment, a transmitter, receiver and/or transceiver might be turned on within a network. That radio may jump quickly in the middle of a hopping sequence that might be very long. To do this, the network device may look at a clock, and use the time of day to see which timeslot number is the present one. The clock may be running all the time for this to be possible. The device may then compute the scrambling sequence and the 'old' or original hopping sequence for the present timeslot, the one just before and the one just after. This computation may be performed using mathematical equation(s) in a rapid manner, allowing the network device to jump in the middle of the hopping sequence. If a channel-repeat occurred, then a channel may be changed as described herein. Accordingly, the change of a channel to resolve (remove) the channel-repeat may be made with the knowledge of only three hopping sequence values.

A different approach consisting of allowing changes in any timeslot might lead to the following undesirable situation. A first channel is changed for a timeslot, which creates a second channel-repeat in the next timeslot. The second channel-repeat can be resolved with a channel change. However, this channel change may create a third channel-repeat for the following timeslot. Thus, under the different approach it is difficult or impossible to know the number of timeslots that need to be considered to reconstruct the new hopping sequence.

FIGS. 8 through 11 are timeslot charts showing aspects of a channel-repeat detection and resolution algorithm, which prevents consecutive timeslots from using the same channel. In the example of FIGS. 8 through 11, two consecutive timeslots sharing the same channel number may be considered a channel-repeat. If a channel-repeat is detected, the channel used by one timeslot associated with the channel-repeat is changed to thereby resolve the channel-repeat.

The example algorithm and discussion is described with respect to even and odd numbered timeslots. This description is for convenience and illustration, and even and odd could be reversed in other examples. In the example shown, channel numbers are changed only in odd-numbered timeslots. Channel-repeat detection analysis is performed when the number of the timeslot is even. If a channel-repeat is detected, the channel number for the previous timeslot (which is odd) is changed to resolve (avoid and/or prevent) the channel-repeat. The channel change should be computed to avoid the detected channel-repeat and also avoid creating a new channel-repeat with the other neighboring timeslot. The process is illustrated in the FIG. 8 for an illustrative 10-channel case.

Figure 8:
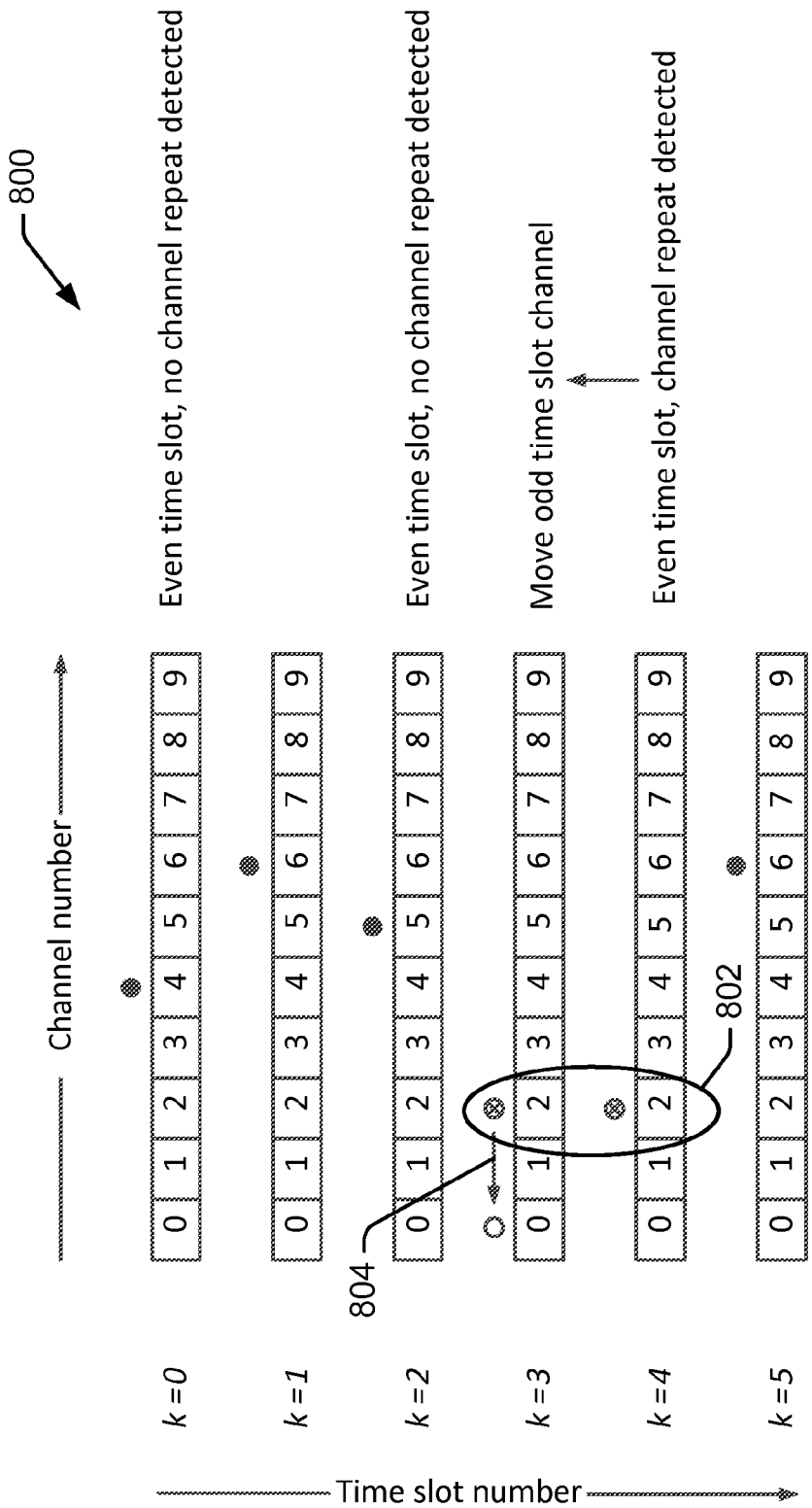
FIG. 8, FIG. 9 and FIG. 10 are timeslot charts showing aspects of a channel-repeat detection and resolution algorithm.

FIG. 8 shows a timeslot chart 800, wherein a channel-repeat is located at an odd-numbered timeslot followed by an even-numbered timeslot. At even timeslots k=0 and k=2, no channel-repeat was detected.

No channel-repeat was detected at timeslot k=0, which uses channel 4, because there is no previous timeslot and timeslot k=1 uses channel 6. Also, no channel-repeat was detected at timeslot k=2, which uses channel 5, because the previous timeslot (k=1) uses channel 6 and the subsequent timeslot (k=3) uses channel 2.

However, in even timeslot k=4 a channel-repeat was detected, since timeslots k=3 and k=4 both use channel 2. Thus, the channel-repeat is indicated at 802, including an odd-numbered timeslot followed by an even-numbered timeslot both assigned to channel 2. To resolve the channel-repeat, the odd timeslot k=3 is assigned a different channel. The timeslot for k=3 must be disassociated from channel 2 (which is used by timeslot k=4) and may not be assigned to channel 5 (which is used by timeslot k=2). Accordingly, another channel for timeslot k=3 may be selected, other than channels 2 and 5. In the example of FIG. 8, the channel selected for timeslot k=3 is channel 0, and the channel change is indicated at 804. The channel may be selected through operation of a pseudo random function, and may be selected using the pseudo random scrambling sequence 130.

Figure 9:
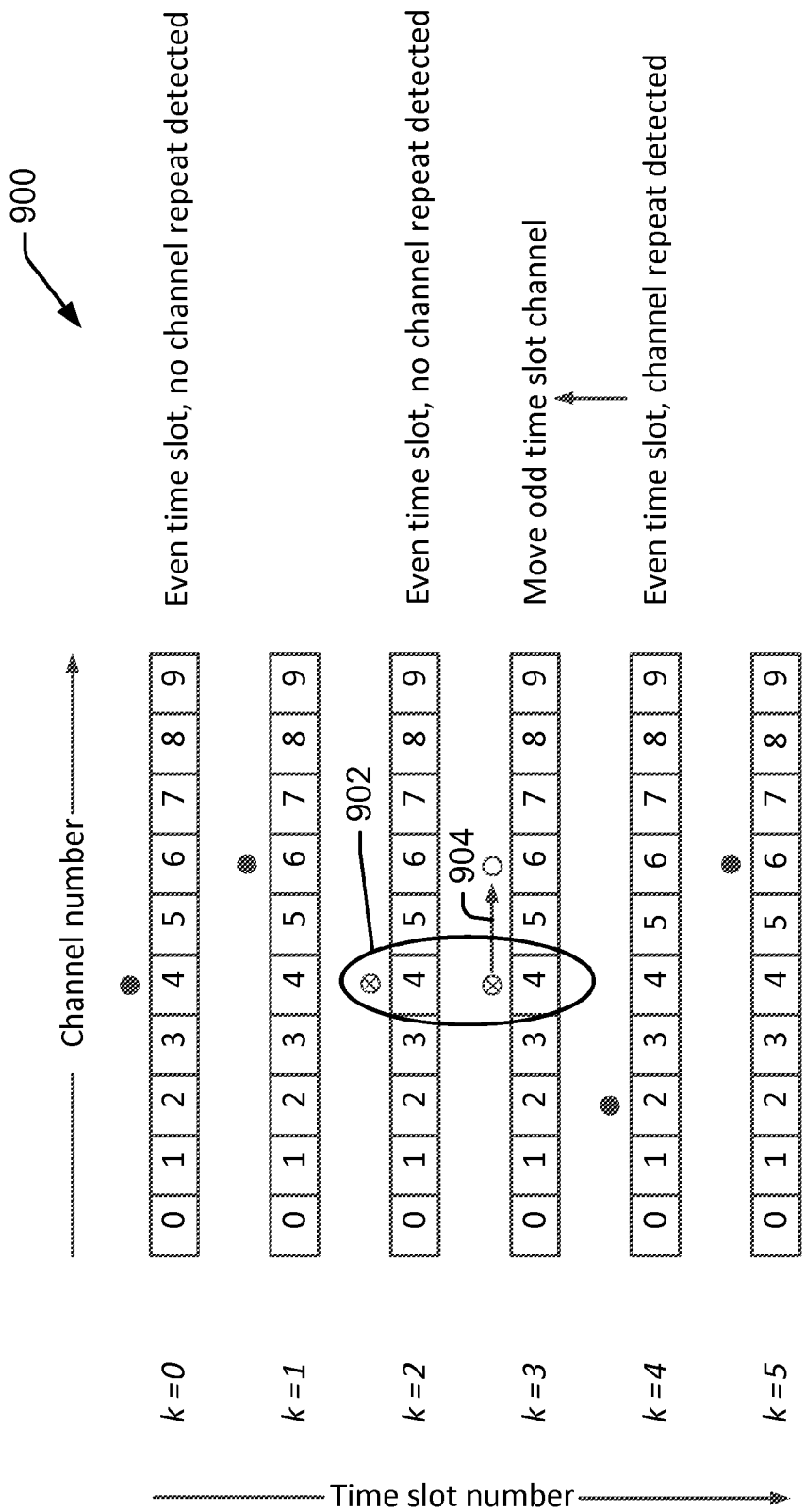

FIG. 9 shows a timeslot chart 900, wherein a channel-repeat is located at an even-numbered timeslot followed by an odd-numbered timeslot. At even timeslots k=0 and k=2, no channel-repeat was detected. No channel-repeat was detected at k=0 because there is no previous timeslot. Also, no channel-repeat was detected at timeslot k=2 because timeslot k=2 uses is channel 4 and timeslot k=1 uses channel 6.

However, at even timeslot k=4 a channel-repeat was detected, i.e., timeslots k=2 and k=3 both use channel 4. Thus, the channel-repeat is indicated at 902, including an even-numbered timeslot followed by an odd-numbered timeslot both assigned to channel 4. To resolve the channel-repeat, the odd timeslot k=3 is assigned a different channel. The timeslot for k=3 must be disassociated from channel 4 (which is used by timeslot k=2) and may not be assigned to channel 2 (which is used by timeslot k=4). Accordingly, another channel for timeslot k=3 may be selected from among channels not including channels 2 and 4. In the example of FIG. 8, the channel selected for timeslot k=3 is channel 6, and the channel change is indicated at 904. The selection of channel 6 may have been made through operation of a pseudo random function, such as the pseudo random scrambling sequence 130.

Figure 10:
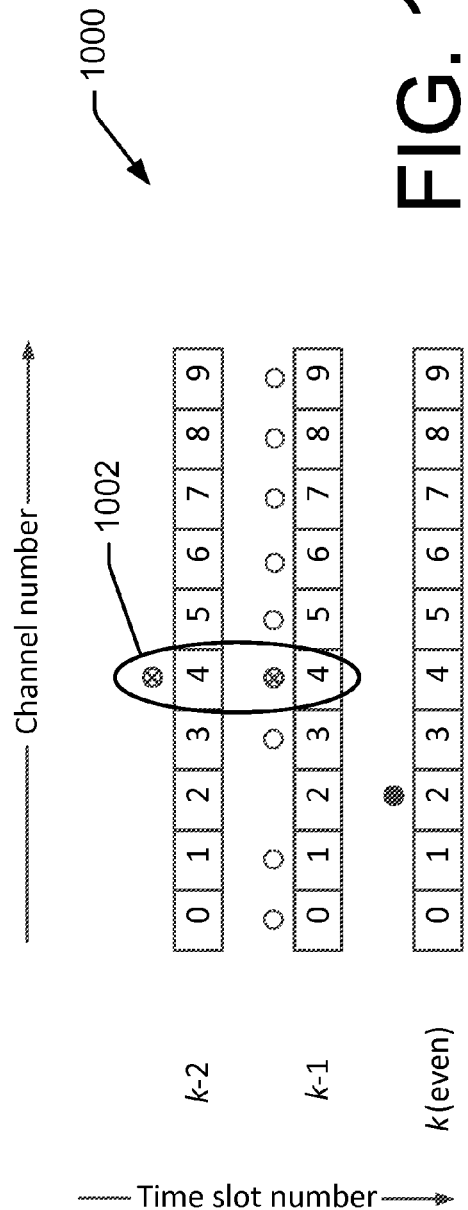

FIG. 10 shows an example 1000 of how the channel used to replace a repeating channel may be selected, to thereby resolve the channel-repeat 1002. In order to increase the randomness of the sequence a random channel may be chosen from among N−2 possibilities, wherein N is the number of channels, and two channels may not be selected due to an existing channel-repeat and a potential channel-repeat. Several algorithms can be used to pick a random channel, but the scrambling sequence value for timeslot k−1, SS(k−1), may be used to make this choice. Accordingly, an example implementation of a random choice algorithm is described. The scrambling sequence modulo (N−2) gives N−2 possible values, and may be expressed:

$$SS(k-1) \text{ modulo}(N-2) \in \{0, 1, \ldots, N-3\} \quad \text{Equation (1)}$$

Each value may be made to correspond to an available channel. To achieve this, this value may be used to shift the channel number away from the channel used in timeslot k−2. Mathematically this is written as:

$$\begin{cases} \text{shift} = (SS(k-1) \text{ modulo } (N-2)) + 1 \\ HS'(k-1) = (HS(k-2) + \text{shift}) \text{ modulo } N \end{cases} \quad \text{Equation (2)}$$

This new hopping sequence value will avoid the channel-repeat with the channel used by timeslot k−2 but not necessarily with the channel used by timeslot k. A channel-repeat with timeslot k will occur if:

$$(HS(k-2) + \text{shift}) \text{ modulo } N = HS(k) \quad \text{Equation (3)}$$

To meet this second condition, a test may be performed for this channel-repeat. If a channel-repeat does occur, the following shift may be applied:

$$\begin{cases} \text{shift} = N-1 \\ HS'(k-1) = (HS(k-2) + \text{shift}) \text{ modulo } N \end{cases} \quad \text{Equation (4)}$$

An example algorithm is therefore:

$$\begin{cases} \text{shift} = (SS(k-1) \text{ modulo } (N-2)) + 1 \\ \text{if shift} = HS(k) - HS(k-2) \text{ modulo } N \text{ then} \\ \quad \text{shift} = N-1 \\ \text{end if} \\ HS'(k-1) = (HS(k-2) + \text{shift}) \text{ modulo } N \end{cases} \quad \text{Equation (5)}$$

Figure 11:
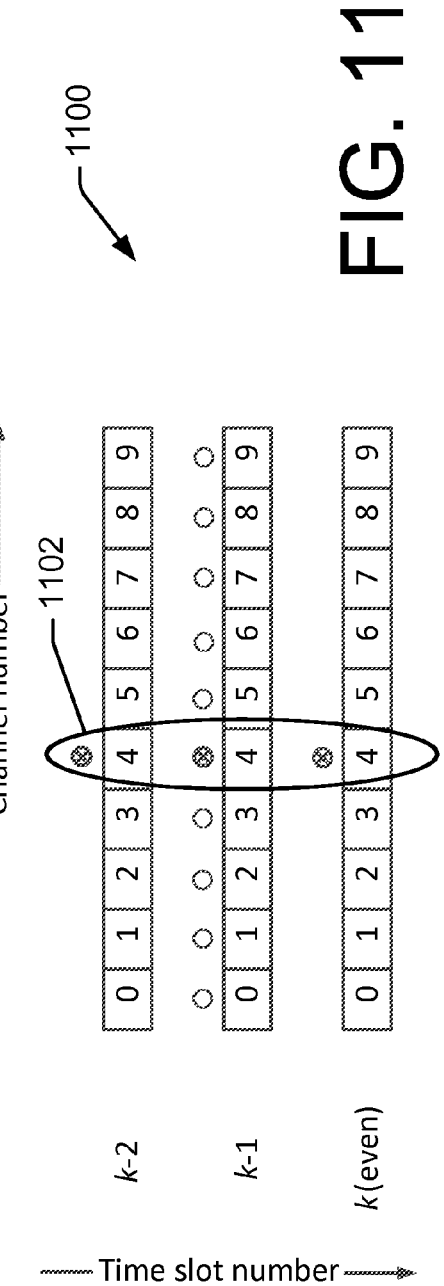
FIG. 11 is a timeslot chart showing a channel-repeat involving three consecutive timeslots.

FIG. 11 shows an example wherein the unmodified hopping sequence uses the same channel for three consecutive timeslots, shown at 1102. This may be considered a double channel-repeat. In the example shown, the middle timeslot is odd, and its channel may be re-associated with one of (N−1) available channels to avoid the channel-repeat (instead of the N−2 channels as was the case in FIGS. 8 through 10). The algorithm for the simple (i.e., two timeslot) channel-repeat can still be used if a channel-repeat extends over three consecutive timeslots, but the algorithm of FIGS. 8 through 10 can also be adapted. However, the resulting randomization gain of such adaptation may be small, and in some applications may not warrant the added complexity of such adaptation.

Figure 12:
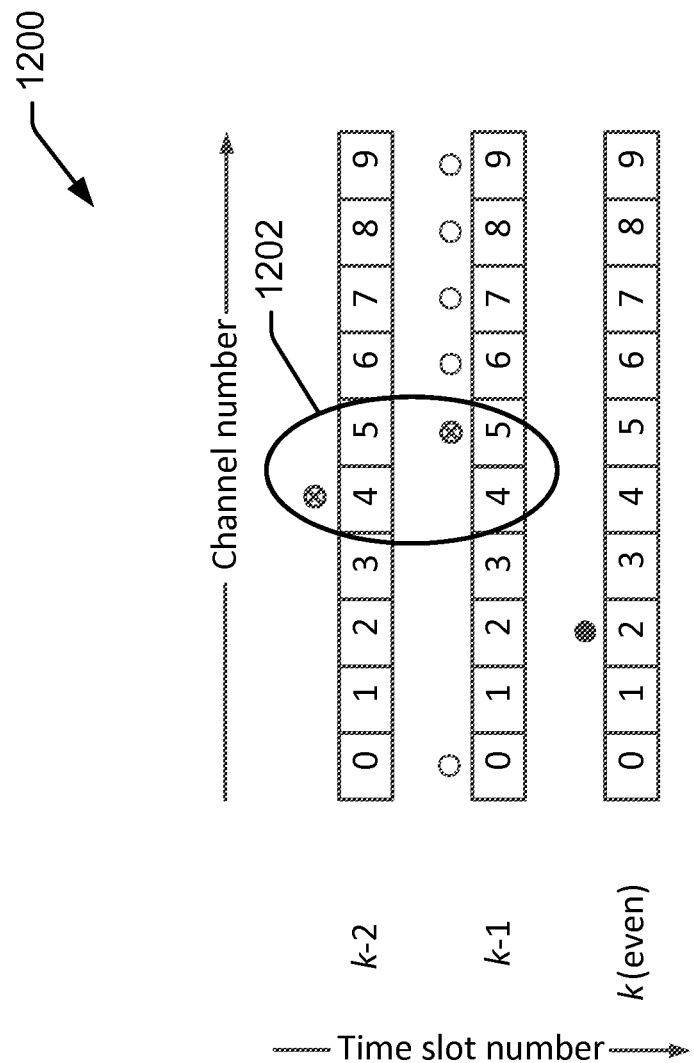
FIG. 12 is a timeslot chart showing aspects of a further example of a channel-repeat detection algorithm, wherein adjacent timeslots using the same channel or a channel different by one channel are considered a channel-repeat.

FIG. 12 is a timeslot chart showing aspects of a further example 1200 of a channel-repeat detection algorithm, wherein adjacent timeslots using the same channel or a channel different by one channel are considered a channel-repeat. In the example shown, timeslots k−2 and k−1 utilize channels 4 and 5, respectively. Because timeslots k−2 and k−1 are adjacent, and because channels 4 and 5 differ by one channel, the channel arrangement 1202 may be considered a channel-repeat. Continuing the example of changing the odd-numbered timeslot, timeslot k−1 may be changed to any of timeslots 0 or 6 through 9. Channels 1 through 3 are unavailable because use of these channels by timeslot k−1 would result in a channel conflict with timeslot k. Channel 4 is not available, because changing the channel of timeslot k−1 to channel 4 would result in a different channel-repeat between timeslots k−2 and k−1. However, if timeslot k−1 is assigned any of channels 0 or 6 through 9 then a channel-repeat is avoided.

Example Techniques for Channel Whitening

Figure 13:
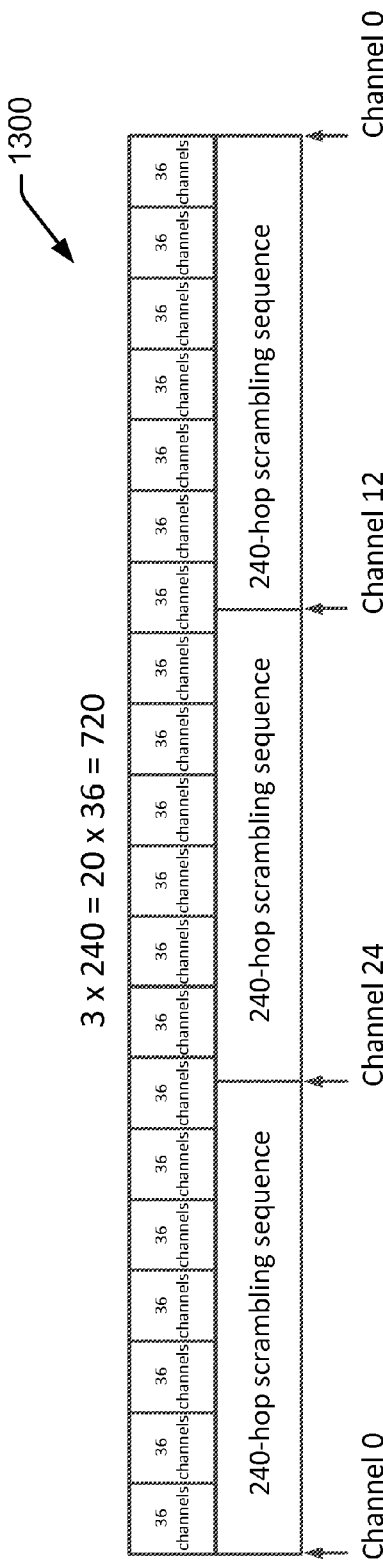
FIG. 13 and FIG. 14 are diagrams supporting a discussion of channel whitening, which may be used to "whiten" RF spectrum after application of a channel-repeat detection and resolution algorithm.
Figure 14:
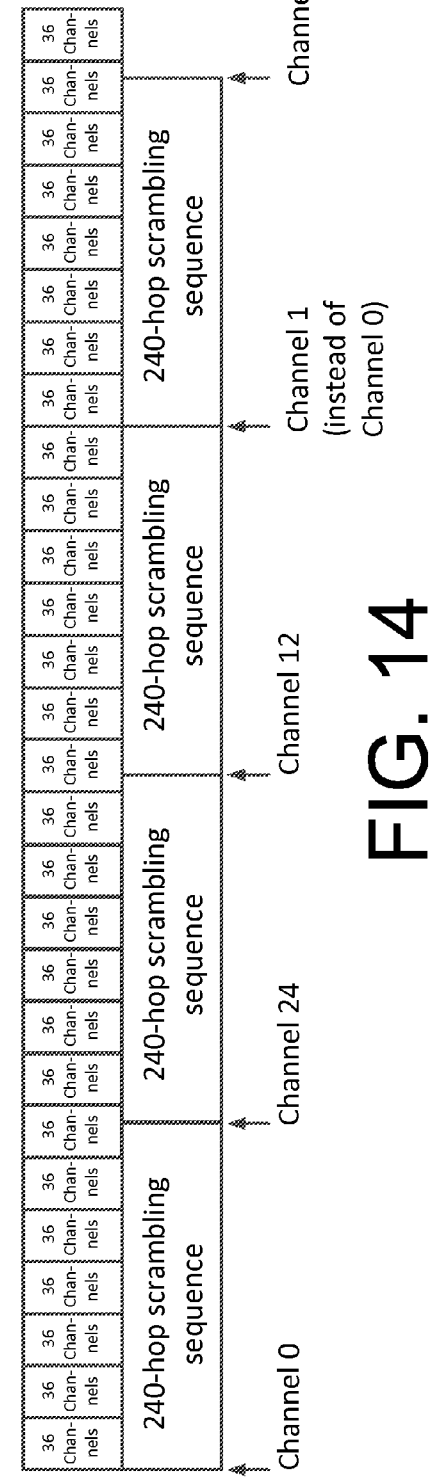

FIGS. 13 and 14 are diagrams supporting a discussion of channel whitening, which may be used to "whiten" RF spectrum after application of a channel-repeat detection and resolution algorithm. If all of the channels within a spectrum are used an equal (or near equal) number of times, the spectrum may be considered to be a white spectrum. This is by analogy to white light, which is light that is relatively equally comprised of different color-frequencies of light. The process of making channel usage more uniform is therefore called whitening.

The initial hopping sequence (e.g., the "old hopping sequence" of FIG. 7), before application of techniques to remove instances of channel-repeat, utilized all channels the same number of times. This is due to the design process of the initial hopping sequence. In particular, only the position of the channels is changed as the unscrambled sequence of channels is scrambled, not the overall frequency of use.

However, the techniques to remove instances of channel-repeat prevent the use of the same channel twice in a row, and may change the overall usage of some channels. Such techniques disturb the symmetry of the design, and it becomes likely that all channels will not be used exactly the same number of times.

For most programs and applications, the techniques to remove instances of channel-repeat result in a hopping sequence that is sufficiently uniform to be acceptable. Other applications may require, or benefit from, more uniform channel usage. Accordingly, techniques for channel whitening may optionally be utilized.

FIG. 13 shows an example of a channel hopping or spreading sequence that is periodic. After a number of timeslots (which may be based at least in part on the number of channels), the pattern or sequence is repeated. FIG. 13 illustrates a channel hopping sequence using 36 channels. After 720 timeslots that include three repetitions of the 240-hop scrambling sequence, the pattern repeats itself.

One consequence of the repetition of the pattern, every 720 timeslots, is that the same resolutions of the same channel-repeats will repeat in a pattern. If these channel-repeats are resolved the same way each time, some channels may be under-utilized and some channels may be over-utilized.

FIG. 13 shows that the period having 720 timeslots is the least common multiple (i.e., the smallest number of timeslots) associable with the 240-hop scrambling sequence and the 36 available channels. Thus, the scrambling sequence may include a greater number of terms than there are available channels in the network. Equation (6) provides an example relationship between a number of timeslots (e.g., 720), an example number of elements in a pseudorandom sequence (e.g., 240), and an example number of available channels (e.g., 36).

$$720 = 3 \times 240 = 20 \times 36 \quad \text{Equation (6)}$$

As noted above, after 720 timeslots, the pattern of FIG. 13 repeats, resulting in potential repetition of uneven channel use. To minimize the uneven channel use, the periodicity may be broken and the spreading sequence may thereby be whitened. In one example, the second repetition of the pattern may be made slightly different from the first one. By making the second repetition slightly different, small imperfections (in evenness of channel usage) caused by the channel-repeat detection and resolution techniques will not disappear but will be slightly different for each repetition of the periodic pattern. Such slight differences (in the imperfections caused by channel-repeat resolution) may tend to be less pronounced over time.

FIG. 14 shows example whitening techniques which provide at least some compensation for uneven channel use introduced by channel-repeat resolution techniques. In the example of FIG. 14, a circular shift of the unscrambled sequence of channels may be performed prior to the second repetition of the 720 timeslots. In the circular shift of the unscrambled sequence of channels, channel 0 becomes channel 1, channel 1 becomes channel 2, . . . , and channel N−1 becomes channel 0. Accordingly, as communication over channels associated with the second iteration of the 720 timeslots is performed, uneven channel use of the first iteration is at least partially averaged out, and in any case, is not identically reinforced by repetition.

Example Techniques for Circadian Cycle Utilization

In some example usages of the techniques described herein, it is convenient to have a hopping sequence that repeats itself after a complete day. This may simplify the operation of software on network devices. For example, if network devices (e.g., endpoints in a utility network setting) have a real-time clock, knowledge of the time of the day can be used to determine a timeslot number and a position in the hopping sequence. The real-time clock may be updated and/or set regularly, and this may be done by the network itself, by another network, by GPS or other means.

If one-day periodicity is desired, some constraints may be considered. For the one-day cycle to be convenient, an integer number of timeslots may be used in a day. Equation (7) provides an example:

Because of the above example's use of 240 elements as the scrambling sequence length, the constraint on timeslot length allows calculation of a simple timeslot length that will satisfy above condition.

Example Techniques for Quasi-Orthogonal Sequence Utilization

Two representative examples provide techniques to generate quasi-orthogonal sequences. If each of two different networks uses one of the quasi-orthogonal sequences, then RF interference between the networks may be reduced.

In a first example, an existing scrambling sequence can be modified with a circular shift. In one example, the circular shift could involve starting with the fifth element in the scrambling sequence rather than the first element. The initial and modified scrambling sequences could be used in different networks, such as to reduce cross-network RF interference. The technique of this example works well in networks that are synchronized to the real time.

In a second example, a different Galois field primitive element may be used (e.g., with the same Galois field) to generate the scrambling sequence for use in different networks. Thus, a given Galois field can produce several different pseudo-random sequences.

Example Methods

In some examples of the techniques discusses herein, the methods of operation may be performed by one or more application specific integrated circuits (ASIC) or may be performed by a general purpose processor utilizing software defined in computer readable media. In the examples and techniques discussed herein, the memory 124 may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

$$\text{Number of timeslots per day} = (24\text{-hour/day} * 3600 \text{ sec/hour})/\text{timeslot length}$$
$$= (24 * 3600 \text{ sec/day})/\text{timeslot length}$$

Equation (7)

An integer number of scrambling sequences may be used in a day to simplify the sequence computation. Equation (8) provides an example of a constraint that may be utilized, wherein the example includes a 240 channel scrambling sequence.

$$\text{No. of scrambling sequences per day} = \text{no. of timeslots per day}/240$$
$$= (24 * 3600 \text{ sec/day})/(240 * \text{timeslot length})$$
$$= (360 \text{ sec/day})/(\text{timeslot length})$$

Equation (8)

As defined herein, computer-readable media does not include transitory media, such as modulated data signals and carrier waves, and/or signals.

FIGS. 15-22 are flow diagrams showing an example processes which are representative of techniques for use in frequency hopping sequence generation, channel-repeat detection and resolution, channel whitening, circadian cycle utilization, and creation and utilization of quasi-orthogonal channel hopping sequences. The processes may, but need not necessarily, be implemented in whole or in part by the hopping sequence generator 126 and/or the network 100. Accordingly, the processes 1500-2200 may be implemented using numerous network nodes, networks and/or systems.

Figure 15:
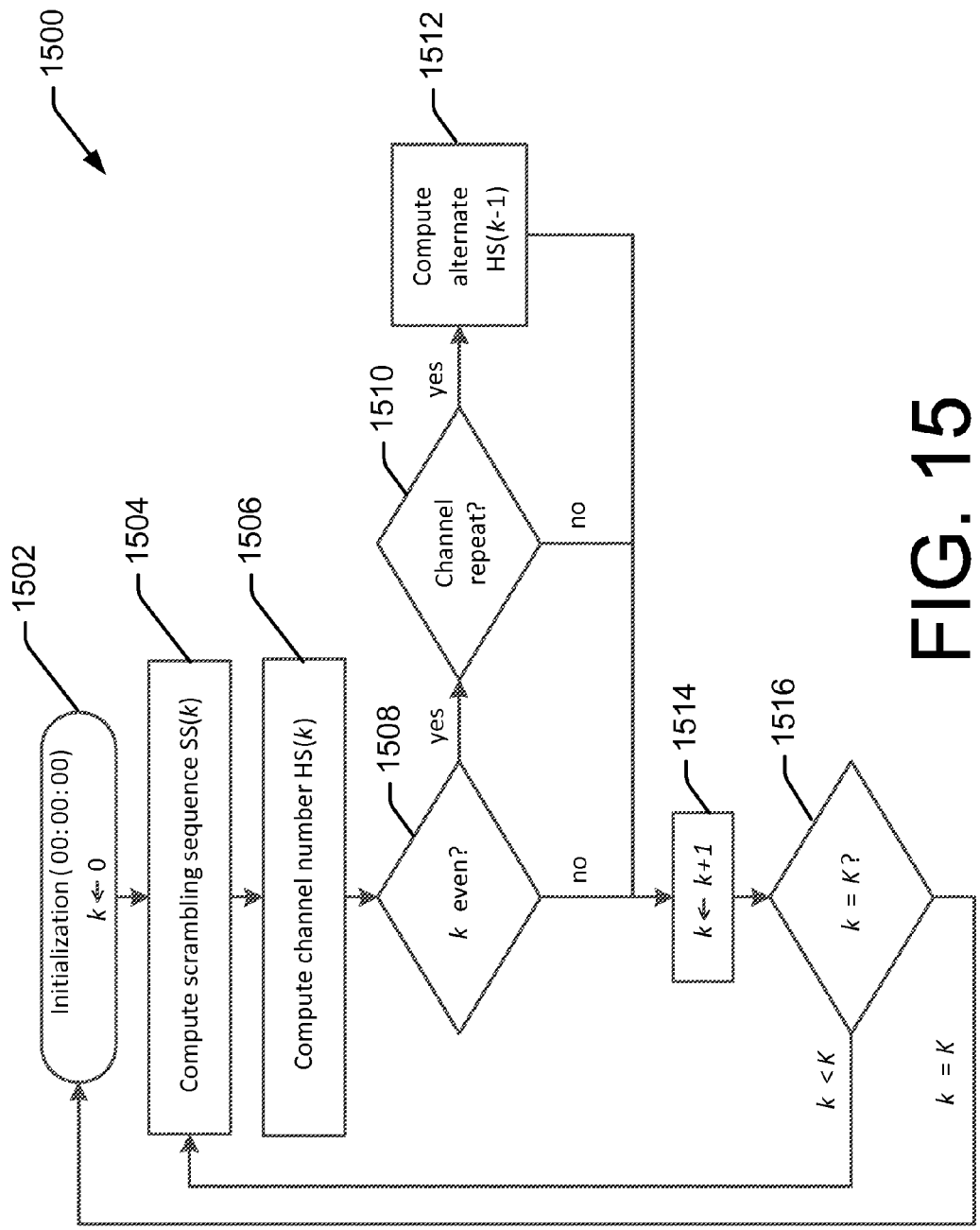
FIG. 15 is a flowchart showing an example hopping sequence calculation.

FIG. 15 is a flowchart showing example techniques 1500 of frequency hopping sequence calculation. The techniques 1500 compute a scrambling sequence to determine a channel for use in each of a plurality of timeslots. The techniques 1500 check for channel-repeats at even-numbered timeslots and change odd-numbered timeslots if there is a channel-repeat. In alternative examples, this could be changed or reversed. Accordingly, a channel hopping sequence could be generated for use in network communications.

At block 1502, a variable k is initialized to a value of zero. The variable k may be used to represent a particular timeslot, i.e., the $k^{th}$ timeslot. As the value of k changes during operation of the techniques 1500, a different location in the scrambling sequence and/or hopping sequence may be considered. In the example shown, the variable k is set to zero at a particular time, such as midnight (e.g., 00:00:00).

At block 1504, all or part of a scrambling sequence is computed. The scrambling sequence may be indicated by the notation SS(k), wherein SS(k) is the $k^{th}$ element of the scrambling sequence. In the example of FIGS. 1, 4 and 5, a scrambling sequence 130 may be created by use of a Galois field.

At block 1506, all or part of a hopping sequence is computed. In the example of FIG. 5, the scrambling sequence 130 is used to create a scrambled sequence of channels 132 from an unscrambled sequence of channels 128. The scrambled sequence of channels 132 may be used as a hopping sequence by a radio. Block 1506 utilizes the notation HS(k), which indicates a particular channel in the hopping sequence (i.e., HS) that is used at the timeslot k.

At block 1508, the techniques 1500 determine if k is even (or odd) valued. In the example shown, channel-repeats are checked for even values of k, and the hopping sequence of odd values of k may be changed, if required due to a channel-repeat. This could be changed or reversed, if desired.

At block 1510, if k is even, a check is made for a channel-repeat. As seen in the example of FIG. 6, a channel-repeat may be usage 602 of a same channel (e.g., channel 1) in two adjacent timeslots (e.g., timeslots 3 and 4) of the channel hopping sequence 132. As seen in the example of FIG. 12, a channel-repeat 1202 may be indicated because two adjacent timeslots (k−2 and k−1) utilize channels (channels 4 and 5) that differ by only one channel. Thus, a channel-repeat may be defined differently, in different circumstances.

At block 1512, if the hopping sequence indicates a channel-repeat, one of the channels is changed to resolve the channel-repeat issue. In the examples of FIGS. 8 and 9, the channel at hopping sequence k=3 is changed. Such change resolves the channel-repeat issue.

At block 1514, the variable k is incremented. Note that if k is originally set to zero, k is incremented at this location. Alternatively, if k was set to K originally, k may be decremented at this location.

At block 1516, the current value of k is compared to the number of timeslots, K. K may be the number of timeslots in a 24-hour day or other period of time. If k<K, then block 1504 is performed. If k=K, then block 1502 is performed.

Figure 16:
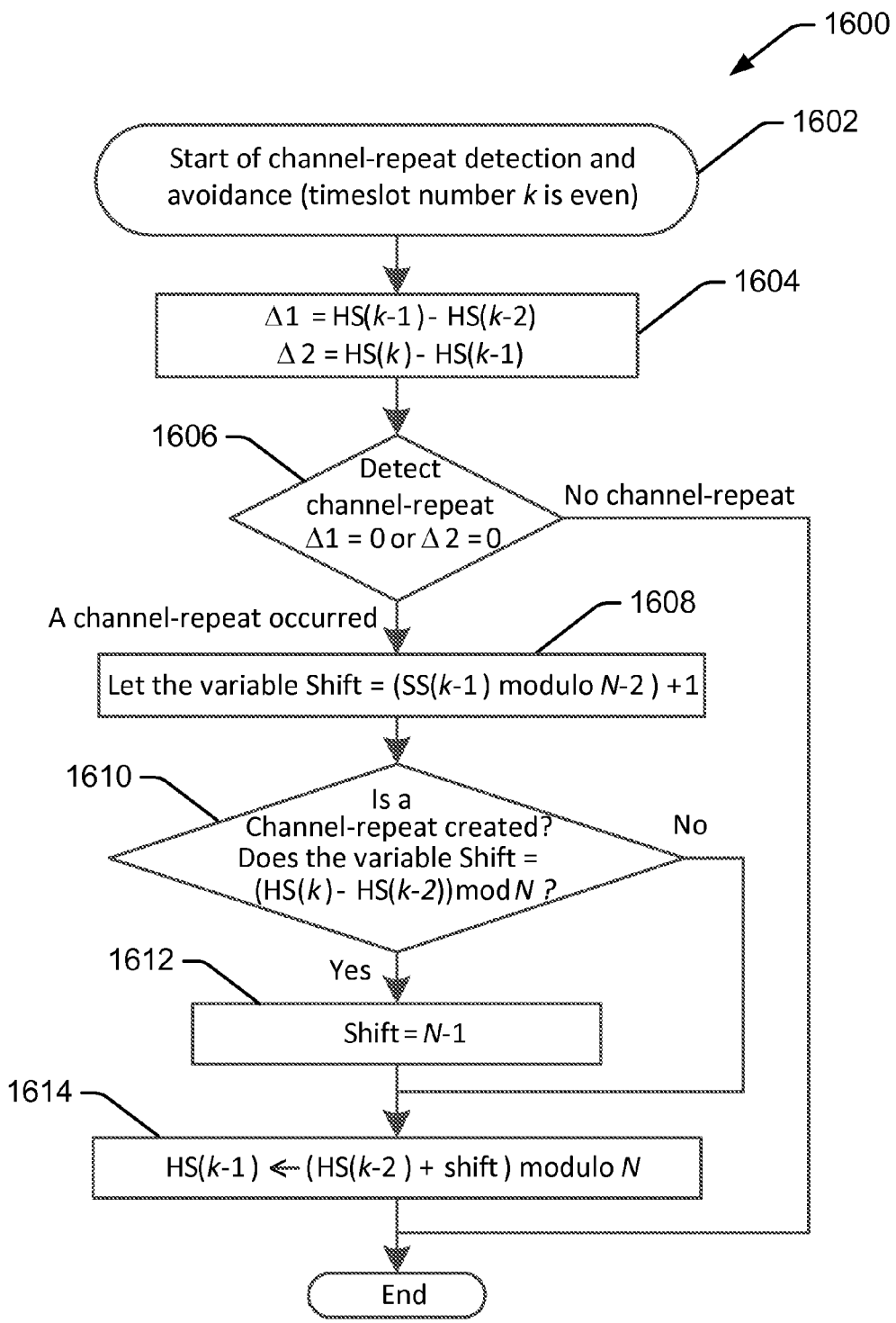
FIG. 16 is a flowchart showing an example of a channel-repeat detection and resolution algorithm.

FIG. 16 is a flowchart showing example techniques 1600 for channel-repeat detection and resolution. In one example, a network device (e.g., network node or endpoint) is activated or awakes and must calculate a timeslot (e.g., using a real-time clock), and then calculate a channel to tune at the timeslot. The techniques 1600 include detection of a channel-repeat, resolving the channel-repeat, and checking for creation of a newly created channel-repeat.

At block 1602, a channel-repeat and avoidance and/or resolution algorithm is initiated. In the example shown, the timeslot number k is an even integer.

At block 1604, the hopping sequence (HS) channel of timeslot k−1 is compared to the hopping sequence channel of timeslot k−2. Additionally, the hopping sequence channel of timeslot k is compared to the hopping sequence channel of timeslot k−1. At block 1606, a check is made for a channel-repeat between timeslots k and k−1, and timeslots k−1 and k−2.

At block 1608, if a channel-repeat occurred, a value of a variable "shift" is calculated. Shift may be set equal to the scrambling sequence channel at timeslot k−1, modulo N−2, plus one. The value of the variable shift may be used to shift, rotate or change the ordering of numbers in the scrambling sequence in a circular manner, by the magnitude of the shift value.

At block 1610, a check is made to determine if the shift, rotation or change applied to the scrambling sequence at block 1608 resulted in creation of a channel-repeat. A channel-repeat will have resulted if the value of the variable shift is equal to the hopping sequence channel at k minus the hopping sequence channel at k−2, modulo N.

At block 1612, if a channel-repeat was created at block 1610, the value of the shift variable is set to N−1.

At block 1614, the channel-repeat is resolved. The channel in the hopping sequence at timeslot k−1 is set to the channel of the hopping sequence at timeslot k−2, plus the shift value, modulo N.

Figure 17:
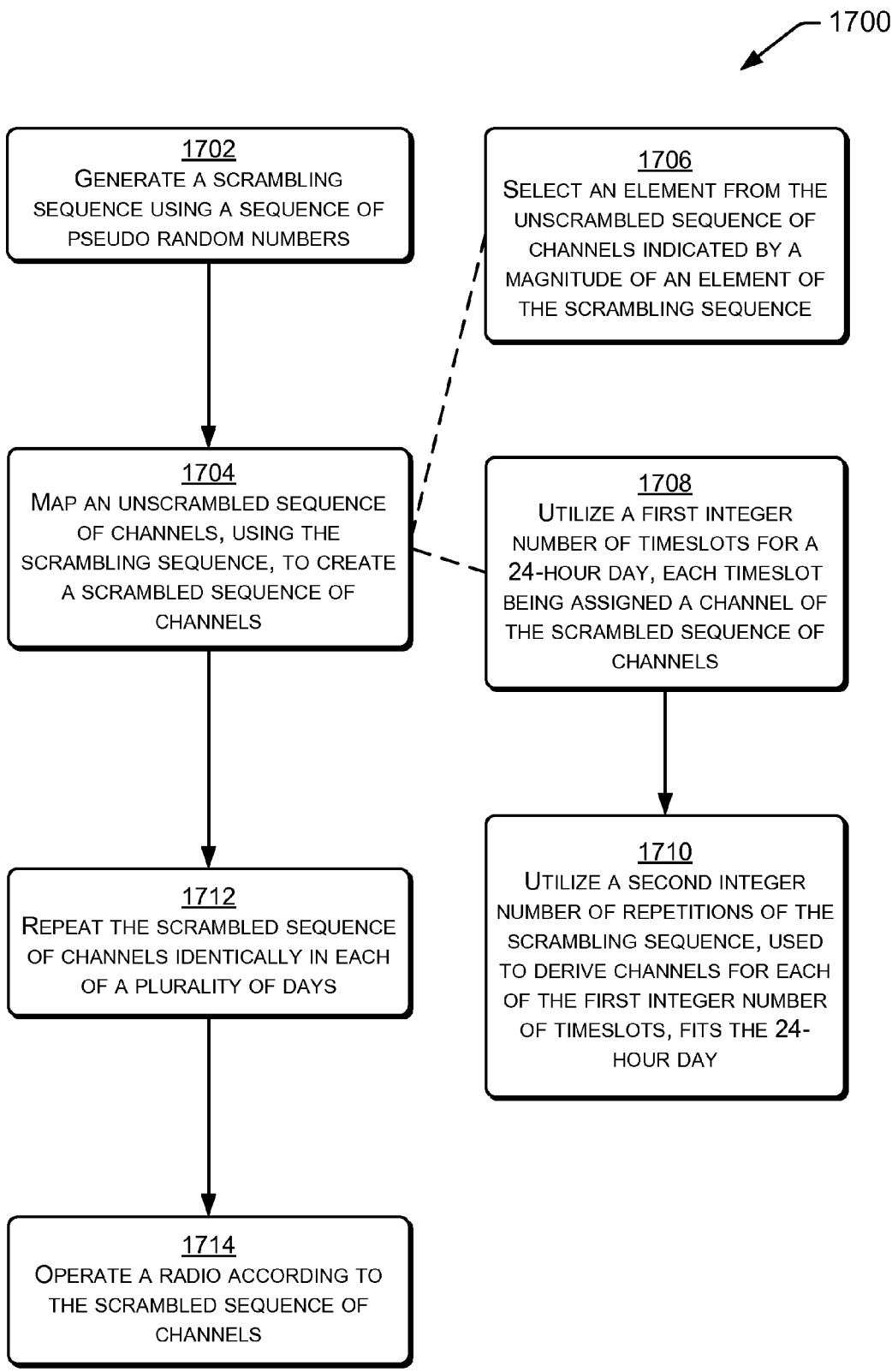
FIG. 17 is a flowchart showing example techniques for hopping sequence generation.

FIG. 17 is a flowchart showing example techniques 1700 for frequency hopping sequence generation. At block 1702, a scrambling sequence is generated. The scrambling sequence may be configured for use in mapping and/or scrambling an unscrambled sequence of channels to create a scrambled sequence of channels. The example scrambling sequence 130 of FIGS. 1 and 4 includes a sequence of numbers based on a periodic sequence of pseudorandom numbers obtained from a Galois field. Other techniques could alternatively be applied to generate the scrambling sequence.

At block 1704, an unscrambled sequence of channels is mapped, changed, scrambled, etc., to create a scrambled sequence of channels. The mapping may be performed using the scrambling sequence (e.g., scrambling sequence 130, from block 1702). FIG. 5 shows an example of a scrambling sequence 130 mapping an unscrambled sequence of channels into a scrambled sequence of channels.

Blocks 1706 through 1710 show example techniques to create the scrambled sequence of channels, and therefore provide different examples of the operation of block 1704. At block 1706, the scrambling sequence may be used to scramble the unscrambled sequence of channels to produce the scrambled sequence of channels. In the example, an element from the unscrambled sequence of channels indicated by a magnitude of an element of the scrambling sequence. In the example of FIG. 5, the first number in the scrambling sequence 130 is 1; therefore, the first term in the unscrambled sequence of channels 128, i.e., zero, is selected as the first term in the scrambled sequence of channels 132. Continuing the example, the second number in the scrambling sequence 130 is 7; therefore, the seventh term in the unscrambled sequence of channels 128, i.e., six, is selected as the second term in the scrambled sequence of channels 132. This process may be repeated.

The mapping process may include one or more constraints and/or characteristics of the timeslot length, scrambling sequence and/or scrambled sequence of channels. At block 1708, a first integer number of timeslots for a 24-hour day may be used. That is, the number of timeslots used may fit evenly into a 24-hour day. Additionally, each timeslot may be assigned a channel from the scrambled sequence of channels. At block 1710, a second integer number (not necessarily the same as the integer discussed at block 1708) of repetitions of the scrambling sequence, which was used to derive channels for each of the first integer number of timeslots, fits the 24-hour day.

At block 1712, the scrambled sequence of channels may be repeated identically in each of a plurality of days. Such repetition allows any network device to use a clock to obtain the time, and then to derive a timeslot associated with that time, and to then derive a channel associated with the timeslot. Because the scrambled sequence of channels is repeated daily, the process is somewhat simpler for the network device. At block 1714, with the timeslot and associated channel known to the network device, a radio may be operated according to an indicated channel from among the scrambled sequence of channels.

Figure 18:
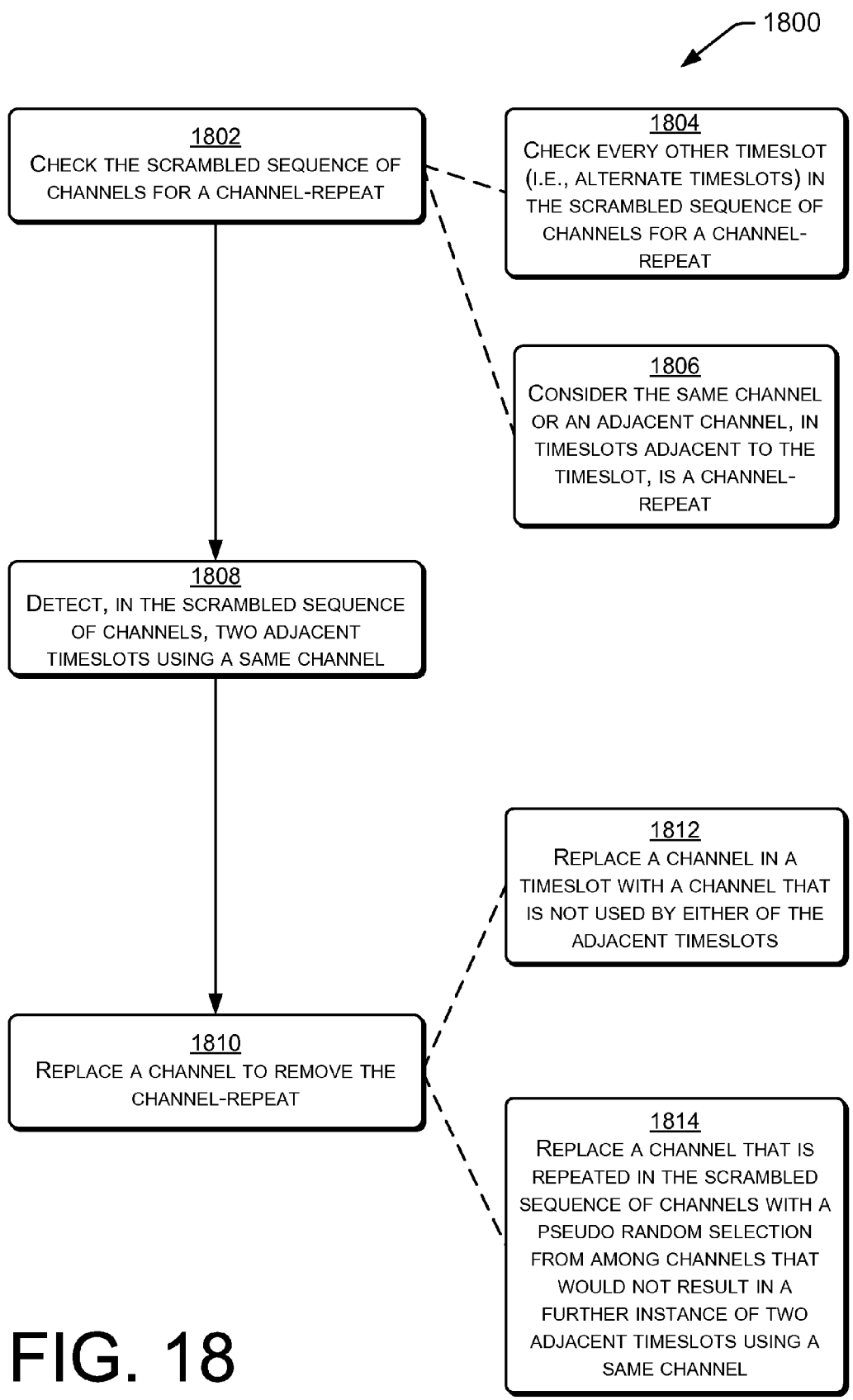
FIG. 18 is a flowchart showing example techniques for channel-repeat detection and resolution.

FIG. 18 is a flowchart showing example techniques 1800 for channel-repeat detection and resolution. At block 1802, the scrambled sequence of channels may be checked for a channel-repeat. Blocks 1804 and 1806 provide example techniques by which the check of block 1802 may be performed. In the example of block 1804, every other timeslot (i.e., alternate timeslots) in the scrambled sequence of channels is checked for a channel-repeat. By checking every other timeslot for a channel-repeat, the calculation is more rapidly performed than if every timeslot is considered. At block 1806, the definition of a channel-repeat may be customized. In one example, the same channel in two adjacent timeslots may be considered to be a channel-repeat. In a second example, two channels differing by one channel (e.g., channels 5 and 6) may be considered to be a channel-repeat. In a third example, two adjacent timeslots utilized by signal having less than a threshold difference in frequency may be considered a channel-repeat. At block 1808, a channel-repeat may be detected. At block 1810, a channel within the scrambled sequence of channels may be changed, to thereby remove the channel-repeat. In the example of block 1812, a channel in a timeslot is replaced with a channel that is not used by either of the adjacent timeslots. Such replacement resolves the channel-repeat. In the example of block 1814, the channel that is repeated in the scrambled sequence of channels may be replaced with a pseudo random selection from among channels that would not result in a further instance of two adjacent timeslots using a same channel. The scrambling sequence 130 (see FIG. 1) may be used to make the pseudo random selection. Accordingly, the channel-repeat is resolved.

Figure 19:
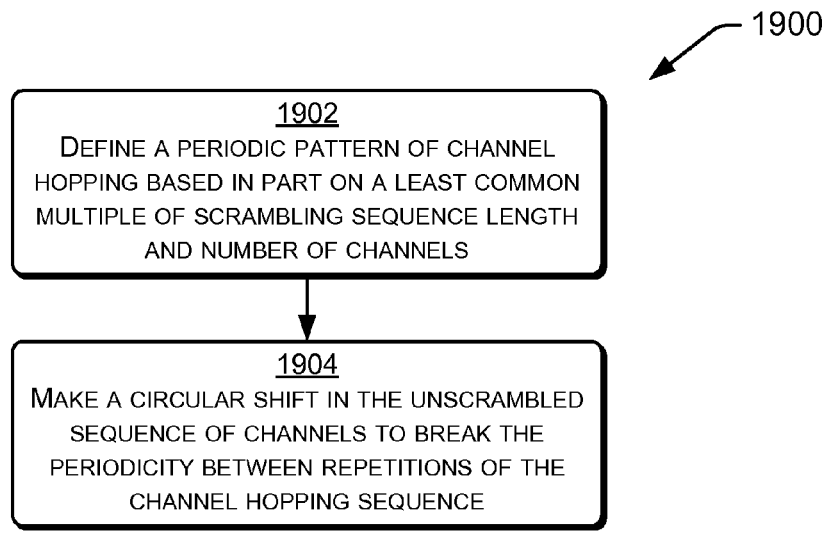
FIG. 19 is a flowchart showing example techniques for channel whitening.

FIG. 19 is a flowchart showing example techniques for channel whitening. At block 1902, a periodic pattern of channel hopping may be defined for use in a network. The periodic pattern may be based at least in part on a least common multiple of scrambling sequence length and number of channels. At block 1904, a circular shift in the unscrambled sequence of channels may be made. Such a shift may break the periodicity between repetitions of the channel hopping sequence.

Figure 20:
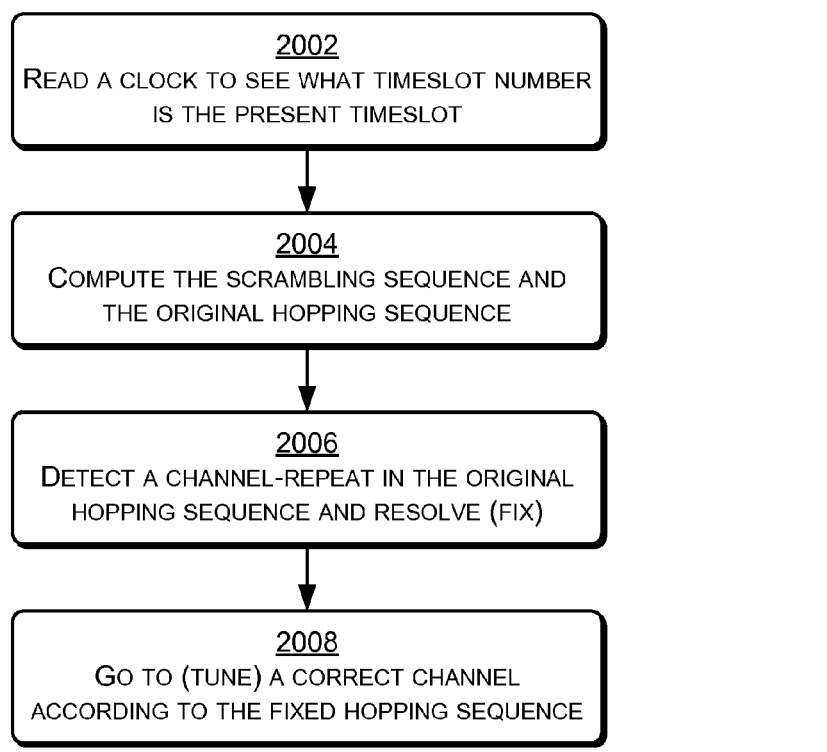
FIG. 20 is a flowchart showing example techniques for utilization of circadian cycles.

FIG. 20 is a flowchart showing example techniques for operation of a network device. At block 2002, a clock is read to determine a present timeslot number. Thus, if timeslots are numbered (e.g., from midnight) the time of day and length of each timeslot may be used to identify the present timeslot. At block 2004, a scrambling sequence and an original or initial channel hopping sequence are computed. The initial channel hopping sequence may include channel-repeats, which may require resolution. At block 2006, a channel-repeat in the original hopping sequence is detected and fixed. The fix should be performed in a manner that does not create a new channel-repeat. At block 2008, the network device and/or associated radio/transceiver device tunes a correct channel according to the fixed hopping sequence.

Figure 21:
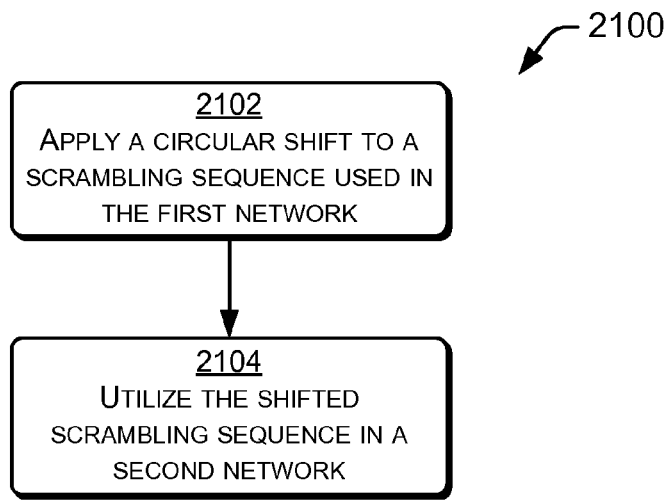
FIG. 21 and FIG. 22 are flowcharts showing example techniques for creating and utilizing quasi-orthogonal channel hopping sequences.
Figure 22:
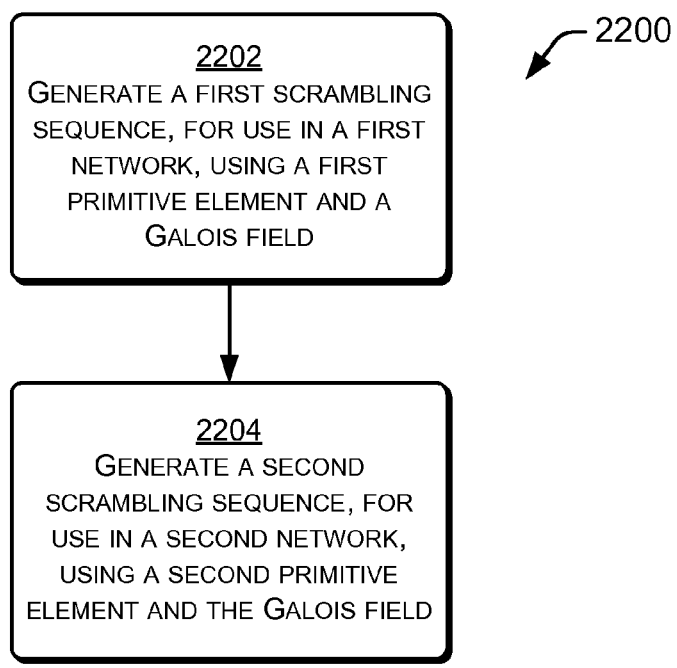

FIGS. 21 and 22 are diagrams showing example techniques 2100 and 2200 for creating and utilizing quasi-orthogonal channel hopping sequences for use within a plurality of networks. The quasi-orthogonal channel hopping sequences reduce interference between network devices on one network with network devices on the other network.

At block 2102, a circular shift may be applied to a scrambling sequence used in the first network. The circular shift of the scrambling sequence will result in a new scrambling sequence. At block 2104, the new or shifted scrambling sequence may be utilized in the second network.

At block 2202, a scrambling sequence, for use in a first network, may be generated using a first primitive element and a Galois field. At block 2204, a second scrambling sequence, for use in a second network, may be generated using a second primitive element and the same Galois field.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    generating a scrambling sequence using a sequence of pseudo random numbers;
    mapping an unscrambled sequence of channels, using the scrambling sequence, to create a scrambled sequence of channels, wherein mapping the unscrambled sequence of channels to create the scrambled sequence of channels comprises selecting an element from the unscrambled sequence of channels indicated by a magnitude of an element of the scrambling sequence; and
    operating a radio according to the scrambled sequence of channels.

2. The method of claim 1, wherein:
    a first integer number of timeslots fills a 24-hour day, each timeslot being assigned a channel of the scrambled sequence of channels; and
    a second integer number of repetitions of the scrambling sequence is used to derive a channel for each timeslot of the first integer number of timeslots.

3. The method of claim 1, wherein the scrambled sequence of channels is repeated in each of a plurality of days.

4. The method of claim 1, additionally comprising:

detecting, in the scrambled sequence of channels, two adjacent timeslots using a same channel; and replacing a channel used by one of the two adjacent timeslots, so that the two adjacent timeslots do not use the same channel, and so that a further instance of two adjacent timeslots using a same channel is not created by the replacing.

5. The method of claim 1, additionally comprising:

checking a timeslot for a channel-repeat, wherein first and second adjacent timeslots, associated with either a same channel or two adjacent channels, are a channel-repeat; and replacing a channel in the first or second timeslot with a channel that is not used by, and that is not adjacent to, a channel used by either of the first and second adjacent timeslots.

6. The method of claim 1, additionally comprising:

checking the scrambled sequence of channels for a channel-repeat; and replacing a channel to remove the channel-repeat.

7. The method of claim 1, additionally comprising:

checking every other timeslot in the scrambled sequence of channels for a channel-repeat; and replacing a channel that is repeated in the scrambled sequence of channels with a pseudo random selection from among channels that would not result in a further instance of two adjacent timeslots using a same channel.

8. The method of claim 1, additionally comprising:

generating the scrambling sequence, for use in a first network, using a first primitive element and a Galois field; and generating a second scrambling sequence, for use in a second network, using a second primitive element and the Galois field.

9. The method of claim 1, additionally comprising:

applying a circular shift to the scrambling sequence to obtain a shifted scrambling sequence, wherein the scrambling sequence was used in a first network; and utilizing the shifted scrambling sequence in a second network.

10. A node in a network, the node comprising:

a processing unit;

a hopping sequence generator, operable by the processing unit, to generate a hopping sequence by operations comprising:

generating a sequence of pseudo random numbers to create a scrambling sequence;

mapping an unscrambled sequence of channels, using the scrambling sequence, to create a scrambled sequence of channels;

recognizing a channel-repeat; and changing a channel used by a timeslot in the scrambled sequence of channels to remove the channel-repeat; and a radio to tune channels according to the scrambled sequence of channels.

11. The node as recited in claim 10, wherein the hopping sequence generator is also configured to perform operations comprising:

calculating a timeslot and associated channel based on time information obtained from a clock of the node; and tuning the radio to the calculated channel.

12. The node as recited in claim 10, wherein the hopping sequence generator is also configured to whiten the scrambled sequence of channels by modifying the unscrambled sequence of channels at intervals.

13. The node as recited in claim 10, wherein the scrambling sequence comprises a greater number of terms than there are available channels in the network.

14. The node as recited in claim 10, wherein:

the scrambled sequence of channels indicates a channel used in each of a plurality of timeslots of uniform length; and there is an integer number of the timeslots in one day.

15. A method, comprising:

generating a scrambling sequence using a sequence of pseudo random numbers;

mapping an unscrambled sequence of channels, using the scrambling sequence, to create a scrambled sequence of channels;

detecting, in the scrambled sequence of channels, two adjacent timeslots using a same channel;

replacing a channel used by one of the two adjacent timeslots, so that the two adjacent timeslots do not use the same channel, and so that a further instance of two adjacent timeslots using a same channel is not created by the replacing; and operating a radio according to the scrambled sequence of channels.

16. The method of claim 15, wherein:

a first integer number of timeslots fills a 24-hour day, each timeslot being assigned a channel of the scrambled sequence of channels; and a second integer number of repetitions of the scrambling sequence is used to derive a channel for each timeslot of the first integer number of timeslots.

17. The method of claim 15, wherein the scrambled sequence of channels is repeated in each of a plurality of days.

18. The method of claim 15, wherein mapping the unscrambled sequence of channels to create the scrambled sequence of channels comprises:

selecting an element from the unscrambled sequence of channels indicated by a magnitude of an element of the scrambling sequence.

19. The method of claim 15, additionally comprising:

generating the scrambling sequence, for use in a first network, using a first primitive element and a Galois field; and generating a second scrambling sequence, for use in a second network, using a second primitive element and the Galois field.

20. The method of claim 15, additionally comprising:

applying a circular shift to the scrambling sequence to obtain a shifted scrambling sequence, wherein the scrambling sequence was used in a first network; and utilizing the shifted scrambling sequence in a second network.

* * * * *